United States Patent
Kandadai et al.

(10) Patent No.: US 12,540,373 B2
(45) Date of Patent: Feb. 3, 2026

(54) NANOPARTICLE-EMBEDDED 2D MATERIAL

(71) Applicant: Oregon State University, Corvallis, OR (US)

(72) Inventors: Nirmala Kandadai, Corvallis, OR (US); Devyn Duryea, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 207 days.

(21) Appl. No.: 18/477,453

(22) Filed: Sep. 28, 2023

(65) Prior Publication Data

US 2024/0110260 A1    Apr. 4, 2024

Related U.S. Application Data

(60) Provisional application No. 63/411,208, filed on Sep. 29, 2022.

(51) Int. Cl.
*C22C 1/10* (2023.01)
*B23K 26/362* (2014.01)
(Continued)

(52) U.S. Cl.
CPC .......... *C22C 1/1026* (2013.01); *B23K 26/362* (2013.01); *C22C 29/12* (2013.01);
(Continued)

(58) Field of Classification Search
CPC ... C22C 1/1026; C22C 29/12; C22C 2202/02; C22C 3/00; C22C 3/005; C22C 28/00; C22C 32/0084; C22C 1/02; B23K 26/362; B23K 2103/02; H01F 1/12; H01F 1/0063; B22F 2007/042; B22F 7/008; B22F 7/04; B22F 1/054; B22F 2009/045; B22F 9/04;
(Continued)

(56) References Cited

PUBLICATIONS

Liu et al. "In situ laser synthesis of Pt nanoparticles embedded in graphene films for wearable strain sensors with ultra-high sensitivity and stability" Carbon 190 January (2022) p. 245-254 (Year: 2022).*

(Continued)

*Primary Examiner* — Anthony J Zimmer
*Assistant Examiner* — Syed T Iqbal
(74) *Attorney, Agent, or Firm* — MUGHAL GAUDRY & FRANKLIN PC

(57) ABSTRACT

A method for forming graphene-oxide (GO) embedded with gallium-iron alloy (galfenol) nanoparticles. The method includes submerging galfenol bulk material in a solution comprising deionized water and polyvinylpyrrolidone (PVP). The method includes ablating, a first time, the galfenol bulk material submerged in the solution with a laser. The method includes removing the galfenol bulk material from the solution after ablating with the laser. The method includes drying the galfenol bulk material after removing the galfenol bulk material from the solution. The method includes submerging galfenol bulk material in deionized water after drying the galfenol bulk material. The method includes ablating, a second time, the galfenol bulk material submerged in the deionized water and ablating a second time the galfenol bulk material submerged in the deionized water.

12 Claims, 19 Drawing Sheets

(51) Int. Cl.
B23K 103/02 (2006.01)
C22C 29/12 (2006.01)
H01F 1/12 (2006.01)
(52) U.S. Cl.
CPC ...... B23K 2103/02 (2018.08); C22C 2202/02 (2013.01); H01F 1/12 (2013.01)
(58) Field of Classification Search
CPC ..... C01B 32/184; C01B 32/194; B82Y 25/00; B82Y 40/00
See application file for complete search history.

(56) References Cited

PUBLICATIONS

Chambel et al. "Laser Writing of Eutectic Gallium-Indium Alloy Graphene-Oxide Electrodes and Semitransparent Conductors" Adv. Mater. Technol. (available online Oct. 2021), 7,2101238 P1-9 (Year: 2021).*
Ban et al., "Graphene Oxide and Its Electrochemical Performance," Int. J. Electrochem. Sci., 2012, 7, 4345-4351 (7 pages).
Blake et al., "Graphene-Based Liquid Crystal Device," ACS 2008, vol. 8, No. 6, 1704-1708, 10.1021/nl080649i, (5 pages).
Cai et al., "A Novel Nonconjugated Polymer as Cathode Buffer Layer for Efficient Organic Solar Cells," ACS Appl. Materials & Interfaces 2018, 10, 28, 24082-24089 (26 pages).
Cheng et al., "Bisphenol A Sensors on Polyimide Fabricated by Laser Direct Writing for Onsite River Water Monitoring at Attomolar Concentration," ACS Appl. Mater. Interfaces 2016, 8, 17784 (9 pages), DOI: 10.1021/acsami.6b03743.
Chhetry et al., "MoS2-Decorated Laser-Induced Graphene for a Highly Sensitive, Hysteresis-free, and Reliable Piezoresistive Strain Sensor," ACS Appl. Mater. Interfaces 2019, vol. 11, 22531, https://doi.org/10.1021/acsami.9b04915 (12 pages).
Choi et al., "3D Macroporous Graphene Frameworks for Supercapacitors with High Energy and Power Densities," ACS Nano 2012, vol. 6, No. 5, 4020-4028, https://doi.org/10.1021/nn3003345 (9 pages).
Choi et al., "Ultrafast Optical Reduction of Graphene Oxide Sheets on Colorless Polyimide Film for Wearable Chemical Sensors," NPG Asia Materials 2016, 8, e315, doi: 10.1038/am.2016.150 (10 pages).
Clerici et al., "In situ MoS2 Decoration of Laser-Induced Graphene as Flexible Supercapacitor Electrodes," ACS Appl. Mater. Interfaces 2016, vol. 8, 10459, https://doi.org/10.1021/acsami.6b00808 (7 pages).
Deng et al., "Wrinkled, Rippled and Crumpled Graphene: an Overview of Formation Mechanism, Electronic Properties, and Applications," Materials Today 2016, vol. 19, No. 4, https://doi.org/10.1016/j.mattod.2015.10.002 (16 pages).
Du et al., "Multifunctional Porous Graphene for Nanoelectronics and Hydrogen Storage: New Properties Revealed by First Principle Calculations," J. Am. Chem. Soc. 2010, vol. 132, No. 9, 2876-2877. https://doi.org/10.1021/ja100156d (2 pages).
Fenzl et al., "Laser-Scribed Graphene Electrodes for Aptamer-Based Biosensing," ACS Sens. 2017, 2, 616-620ACS Sens. 2017, 2, 616-620, DOI: 10.1021/acssensors.7b00066 (5 pages).
Ferrari et al., "Raman Spectrum of Graphene and Graphene Layers," Phys. Rev. Lett. 2006, 97, 187401, DOI:https://doi.org/10.1103/PhysRevLett.97.187401 (4 pages).
Fu et al., "Single Layers of MoS2/Graphene Nanosheets Embedded in Activated Carbon Nanofibers for High-Performance Supercapacitor," J. Alloys Compd. 2021, 829, 154557, https://doi.org/10.1016/j.jallcom.2020.154557 (8 pages).
Groo et al., "Transfer Printed Laser Induced Graphene Strain Gauges for Embedded Sensing in Fiberglass Composites," Composites Part B 219 (2021) 108932 (7 pages).
Guo et al., "Two-Beam-Laser Interference Mediated Reduction, Patterning and Nanostructuring of Graphene Oxide for the Production of a Flexible Humidity Sensing Device," Carbon 50 2012, 1667-1673 (7 pages).

He et al., "Iron Gallium Oxide with High-Capacity and Super-Rate Performance as New Anode Materials for Li-Ion Capacitors," Energy Fuels 2021, 35, 9, 8378-8386, https://doi.org/10.1021/acs.energyfuels.1c00515 (9 pages).
Huang et al., "Laser-Induced Graphene: En Route to Smart Sensing," Nano-Micro Lett., 2020 12:157 (17 pages).
Jeong et al., "Highly Skin-Conformal Laser-Induced Graphene-Based Human Motion Monitoring Sensor," Nanomaterials 2021. vol. 11, 951, https://doi.org/10.3390/nano11040951 (15 pages).
Kim et al., "Durable and Water-Floatable Ionic Polymer Actuator with Hydrophobic and Asymmetrically Laser-Scribed Reduced Graphene Oxide Paper Electrodes," ACS NANO vol. 8, No. 3, 2014, pp. 2986-2997 (12 pages).
Laelabadi et al., "One-Step Fabrication of Flexible, Cost/Time Effective, and High Energy Storage Reduced Graphene Oxide@PANI Supercapacitor," ACS Appl. Energy Mater. 2020, 3, 5301-5312 (12 pages).
Lee et al., "Green Synthesis of Laser-Induced Graphene with Copper Oxide Nanoparticles for Deicing Based on Photo-Electrothermal Effect," Nanomaterials 2022 12(6), 960, https://doi.org/10.3390/nano12060960, (12 pages).
Li et al., "Large-Area Synthesis of High-Quality and Uniform Graphene Films on Copper Foils," Science, vol. 324, Jun. 2009, 1312-1314 (4 pages).
Li et al., "Optical Properties of Edible Oils within Spectral Range from 300 to 2500 nm Determined by Double Optical Pathlength Transmission Method," Applied Optics. May 2015, 54(13): 3886-3893 (8 pages).
Lin et al., "Laser-Induced Porous Graphene Films from Commercial Polymers," Nature Communications 2014, vol. 5, Article No. 5714 (8 pages).
Liu et al., "Graphene-Based Carbon Materials for Electrochemical Energy Storage," Journal of Nanomaterials 2013, 1-11 (12 pages).
Liu et al., "In Situ Laser Synthesis of Pt Nanoparticles Embedded in Graphene Films for Wearable Strain Sensors with Ultra-High Sensitivity and Stability," Carbon 190 (2022) 245e254 (10 pages), https://doi.org/10.1016/j.carbon.2022.01.020.
Moreno et al., "Bottom-Up Synthesis of Multifunctional Nanoporous Graphene," Science 2018, 360, 199-203 (6 pages).
Peng et al., "Flexible Boron-Doped Laser-Induced Graphene Microsupercapacitors," ACS Nano 2015, 9(6):5868-75. doi: 10.1021/acsnano.5b00436 (8 pages).
Rahimi et al., "Highly Stretchable and Sensitive Unidirectional Strain Sensor via Laser Carbonization," ACS 2015, 7, p. 4463-4470 (8 pages), https://pubs.acs.org/doi/10.1021/am509087u.
Rao et al., "Laser In-Situ Synthesis of Metallic Cobalt Decorated Porous Graphene for Flexible In-Plane Microsupercapacitors," J Colloid Interface Sci 2022, 15:610:775-784. doi: 10.1016/j.jcis.2021.11.116 (XX pages).
Reina et al., "Layer Area, Few-Layer Graphene Films on Arbitrary Substrates by Chemical Vapor Deposition," ACS Appl Material & Interfaces 2015, vol. 8 (2 pages).
Scardaci et al., "Reduction of Graphene Oxide by Laser Scribing in Different Atmospheres and Application in Humidity Sensing," Journal of Nanomaterials, vol. 2020, Article ID 4946954, https://doi.org/10.1155/2020/4946954 (7 pages).
Shin et al., "Multilevel Resistive Switching Nonvolatile Memory Based on MoS2 Nanosheet-Embedded Graphene Oxide," 2D Mater. 2016, vol. 3, No. 3, 034002, DOI 10.1088/2053-1583/3/3/034002 (10 pages).
Siegman, Lasers (University Science Books, 1986), chapter 15: Ray Optics and Ray Matrices. pp. 584-585.
Soares et al., "Laser-Induced Graphene Electrochemical Immunosensors for Rapid and Label-Free Monitoring of *Salmonella enterica* in Chicken Broth," ACS Sens. 2020, 5, 1900-1911 (12 pages), https://dx.doi.org/10.1021/acssensors.9b02345.
Stanford et al., "High-Resolution Laser-Induced Graphene. Flexible Electronics beyond the Visible Limit," ACS Appl. Mater. Interfaces 2020, 12, 10902-10907, https://dx.doi.org/10.1021/acsami.0c01377 (6 pages).
Strong et al., "Patterning and Electronic Tuning of Laser Scribed Graphene for Flexible All-Carbon Devices," ACS NANO 2012, vol. 6, No. 2, 1395-1403 (9 pages).

(56) References Cited

PUBLICATIONS

Su et al., "High-Quality Thin Graphene Films from Fast Electrochemical Exfoliation," ACS Nano, 2011, col. 5, No. 3, 2332-2339 (8 pages).
Sun et al., "Gas-Permeable, Multifunctional On-Skin Electronics Based on Laser-Induced Porous Graphene and Sugar-Templated Elastomer Sponges," Advanced Materials, 2018, vol. 30, 1804327 DOI: 10.1002/adma.201804327 (8 pages).
Tian et al., "Scalable Fabrication of High-Performance and Flexible Graphene Strain Sensors," Nanoscale, 2014, 6, 699-705 (7 pages), DOI: 10.1039/c3nr04521h.
Vanegas et al., "Laser Scribed Graphene Biosensor for Detection of Biogenic Amines in Food Samples Using Locally Sourced Materials," Biosensors 2018, 8, 42 (19 pages); doi:10.3390/bios8020042.
Wang et al., "Freestanding Laser Induced Graphene Paper Based Liquid Sensors," Carbon 2019, vol. 153, 472, https://doi.org/10.1016/j.carbon.2019.07.054 (29 pages).
Wang et al., "Tailoring the Surface Morphology and Nanoparticle Distribution of Laser-Induced Graphene/Co3O4 for High-Performance Flexible Microsupercapacitors," Applied Surface Science 2020, vol. 504, 144487, https://doi.org/10.1016/j.apsusc.2019.144487 (10 pages).
Xu et al., "Effective Design of MnO2 Nanoparticles Embedded in Laser-Induced Graphene as Shape-Controllable Electrodes for Flexible Planar Microsupercapacitors," Appl. Surf. Sci. 2022, vol. 571, 151385 ( pages).
Xu et al., "Self-Assembled Graphene Hydrogel via a One-Step Hydrothermal Process," ACS Nano 2010, vol. 4, No. 7, 4324-4330 (7 pages).
Xu et al., "Versatile Strategy to Design Flexible Planar-Integrated Microsupercapacitors Based on Co3O4-Decorated Laser-Induced Graphene," ACS Appl. Energy Mater. 2020, 3, 11, 10676-10684, https://doi.org/10.1021/acsaem.0c01744 (9 pages).
Ye et al., "High Performance Electrocatalytic Reaction of Hydrogen and Oxygen on Ruthenium Nanoclusters," ACS Appl. Mater. Interfaces 2017, 9, 3785-3791 (7 pages), DOI: 10.1021/acsami.6b15725.
Ye et al., "In Situ Formation of Metal Oxide Nanocrystals Embedded in Laser-Induced Graphene," ACS Nano 2015, 9 (9):9244-51. doi: 10.1021/acsnano.5b04138 (8 pages).
Zhao et al., "Boosting the Performance of Flexible In-Plane Micro-Supercapacitors by Engineering MoS2 Nanoparticles Embedded in Laser-Induced Graphene," J. Alloys Compd. 2021, 887, 161514, https://doi.org/10.1016/j.jallcom.2021.161514 (9 pages).
Alahnomi et al.,"Review of Recent Microwave Planar Resonator-Based Sensors: Techniques of Complex Permittivity Extraction, Applications, Open Challenges and Future Research Directions," Sensors, vol. 21, No. 7, p. 2267, 2021 (38 pages).
Amin et al., "A dynamically reconfigurable Fano metamaterial through graphene tuning for switching and sensing applications," Scientific reports, vol. 3, No. 1, pp. 1-8, 2013.
Amin et al., "A THz graphene metasurface for polarization selective virus sensing." Carbon, vol. 176, pp. 580-591, 2021 (13 pages).
Amin et al., "Fano resonance based ultra high-contrast electromagnetic switch," Applied Physics Letters, vol. 110, No. 18, 2017 (7 pages).
Amin et al., "Slow wave applications of electromagnetically induced transparency in microstrip resonator," Scientific reports, vol. 8, No. 1, p. 2357, 2018.
Askari et al., "A refractive-index-based microwave sensor based on classical electromagnetically induced transparency in metamaterials," Optik, vol. 253, p. 168589, 2022 (11 pages).
Beruete et al., "Terahertz sensing based on meta-surfaces," Advanced Optical Materials, vol. 8, No. 3, p. 1900721-1900721, 2020 (26 pages).
Brinker et al., "Review of advances in microwave and millimetre-wave NDT&E: Principles and applications," Philosophical Transactions of the Royal Society A, vol. 378, No. 2182, p. 20190585, 2020 (29 pages).
Chen et al., "Robust method to retrieve the constitutive effective parameters of metamaterials," Physical review E, vol. 70, No. 1, p. 016608, 2004 (7 pages).
Dai et al., "Microfluidics-based microwave sensor," Sensors and Actuators A: Physical, vol. 309, p. 111910, 2020 (16 pages).
Gan et al., "Differential microwave microfluidic sensor based on microstrip complementary split-ring resonator (MCSRR) structure," IEEE Sensors Journal, vol. 20, No. 11, pp. 5876-5884, 2020 (9 pages).
Haq et al., "A Review of Contemporary Microwave Antenna Sensors: Designs, Fabrication Techniques, and Potential Application," IEEE Access, 2023, vol. 11 40064-40074 (11 pages).
Irene, "Applications of spectroscopic ellipsometry to microelectronics," Thin Solid Films, vol. 233, No. 1-2, pp. 96-111, 1993 (43 pages).
Izhar et al., "Monostatic microwave ellipsometry for material characterization," Waves in Random and Complex Media, pp. 1-14, 2021 (15 pages).
Joffe et al., "Novel microwave near-field sensors for material characterization, biology, and nanotechnology," Journal of Applied Physics, vol. 113, No. 6, 2013 (16 pages).
Johs et al., "Recent developments in spectroscopic ellipsometry for in-situ applications," Optical Metrology Roadmap for the Semiconductor, Optical, and Data Storage Industries II, vol. 4449, pp. 41-57, 2001 (18 pages).
Jungk, "Possibilities and limitations of ellipsometry," Thin Solid Films, vol. 234, No. 1-2, pp. 428-431, 1993 (4 pages).
Karl et al., "Characterization of an active metasurface using terahertz ellipsometry," Applied Physics Letters, vol. 111, No. 19, 2017 (6 pages).
Lin et al., "A group-delay-based sensor using active EIT-like effect with double sensing applications," IEEE Sensors Journal, vol. 18, No. 22, pp. 9251-9256, 2018 (6 pages).
Lin et al., "An EIT-based compact microwave sensor with double sensing functions," IEEE Sensors Journal, vol. 16, No. 2, pp. 293-298, 2016 (6 pages).
Liu et al., "Electromagnetically induced transparency in optical microcavities," Nanophotonics, vol. 6, No. 5, pp. 789-811, 2017 (23 pages).
Mason et al., "A resonant co-planar sensor at microwave frequencies for biomedical applications," Sensors and Actuators A: Physical, vol. 202, pp. 170-175, 2013 (6 pages).
Mirzavand et al., "High-resolution bal- anced microwave material sensor with extended dielectric range," IEEE Transactions on Industrial Electronics, vol. 64, No. 2, pp. 1552-1560, 2016 (9 pages).
Munoz-Enano et al., Planar microwave resonant sensors: A review and recent developments, Applied Sciences, vol. 10, No. 7, p. 2615, 2020 (30 pages).
Nepa et al., "Near-field-focused microwave antennas: Near-field shaping and implementation." IEEE Antennas and Propagation Magazine, vol. 59, No. 3, pp. 42-53, 2017 (12 pages).
Nyfors, "Industrial microwave sensors—a review," Subsurface Sensing Technologies and Applications, vol. 1, No. 1, pp. 23-43, 2000 (21 pages).
Oates et al., "Characterization of plasmonic effects in thin films and metamaterials using spectroscopic ellipsometry," Progress in Surface Science, vol. 86, No. 11-12, pp. 328-376, 2011 (49 pages).
Rahman et al., "Planar microwave sensors for accurate measurement of material characterization: A review," TELKOMNIKA (Telecommunication Computing Electronics and Control), vol. 15, No. 3, pp. 1108-1118, 2017 (11 pages).
Ramzan et al., "Electromagnetically induced absorption in the near-field of microwave radiative elements with application to foliage moisture sensing," IEEE Access, vol. 6, p. 77859-77868, 2018 (10 pages).
Schubert, "Another century of ellipsometry," Annalen der Physik, vol. 518, No. 7-8, pp. 480-497, 2006 (19 pages).
Sharma et al., "A microwave cavity resonator sensor for water-in-oil measurements," Sensors and Actuators B: Chemical, vol. 262, pp. 200-210, 2018 (11 pages).

(56) References Cited

PUBLICATIONS

Shi et al., "A retrieval method of effective electromagnetic parameters for inhomogeneous metamaterials," IEEE Transactions on Microwave Theory and Techniques, vol. 65, No. 4, pp. 1160-1178, 2017 (19 pages).

Sidiqqui et al., "An ultra-sensitive lorentz microwave sensor for detection of low-permittivity gaseous water states and sub-wavelength biosamples," IEEE Sensors Journal, vol. 21, No. 22, p. 26014-26022, 2021 (9 pages).

Smith et al., "Electromagnetic parameter retrieval from inhomogeneous metamaterials," Physical review E, vol. 71, No. 3, p. 036617, 2005 (11 pages).

Yan et al., "The terahertz electromagnetically induced transparency-like metamaterials for sensitive biosensors in the detection of cancer cells," Biosensors and Bioelectronics, vol. 126, pp. 485-492, 2019 (18 pages).

Zheng et al., "A review of EMG-, FMG-, and EIT-based biosensors and relevant human-machine interactivities and biomedical applications," Biosensors, vol. 12, No. 7, p. 516, 2022 (37 pages).

Zhu et al., "Dual-band electromagnetically induced transparency (EIT) terahertz metamaterial sensor," Optical Materials Express, vol. 11, No. 7, pp. 2109-2121, 2021 (13 pages).

\* cited by examiner

640

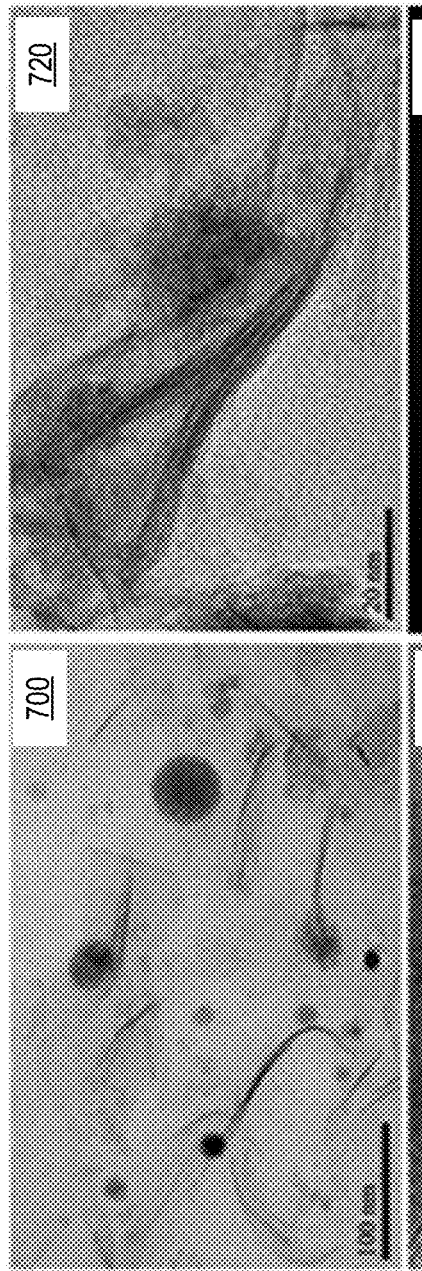
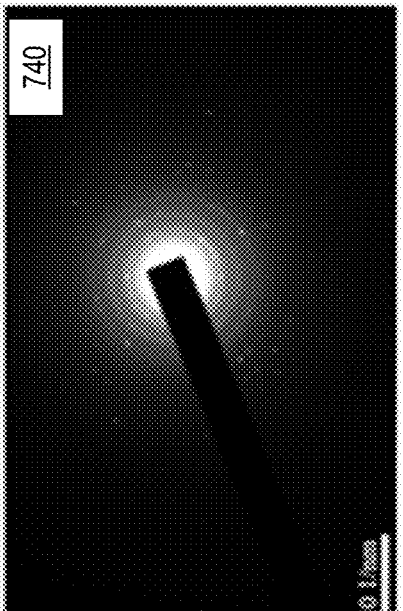
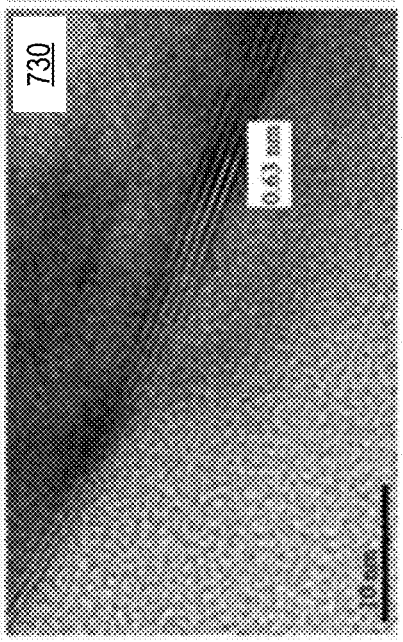
Fig. 7A Fig. 7B Fig. 7C Fig. 7D

NANOPARTICLE-EMBEDDED 2D MATERIAL

CLAIM FOR PRIORITY

This application is a continuation of, and claims the benefit of priority to U.S. Provisional Patent Application No. 63/411,208, filed on Sep. 29, 2023, titled "GALLIUM-IRON NANOPARTICLE EMBEDDED LASER-INDUCED GRAPHENE," and which is incorporated by reference in entirety.

BACKGROUND

Graphene is a single layer of carbon atoms arranged in a two-dimensional honeycomb lattice. This structure can be visually observed as thin "sheets" of carbon. The atoms in the graphene sheets are covalently bonded, giving the structure electrical conductivity despite being extremely thin. Complex processes such as chemical vapor deposition (CVD) and electrochemical exfoliation may be used to embed metal nanoparticles in graphene. However, these processes for embedding nanoparticles are complex.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale and exact locations. For example, the dimensions of some elements may be exaggerated relative to other elements for clarity. Also, various physical features may be represented in their simplified "ideal" forms and geometries for clarity of discussion, but it is nevertheless to be understood that practical implementations may approximate the illustrated ideals. For example, smooth surfaces and square intersections may be drawn in disregard of finite roughness, corner-rounding, and imperfect angular intersections. Further, where considered appropriate, reference labels have been repeated among the figures to indicate corresponding or analogous elements.

While the disclosure is susceptible to various modifications and alternative forms, specific examples have been shown by way of example in the drawings and will be described in detail herein. However, the disclosure is not intended to be limited to the forms disclosed. Rather, the intention is to cover all modifications, equivalents and alternatives falling within the scope of the disclosure as defined by the appended claims.

FIG. 7A is a TEM image of GO folds and galfenol-oxide nanoparticles, in accordance with at least one implementation.

FIG. 7B illustrates a high-resolution TEM image of GO folds, in accordance with at least one implementation.

FIG. 7C illustrates a TEM image of lattice dimensions of GO folds, in accordance with at least one implementation.

FIG. 7D illustrates a TEM image of the electron diffraction pattern of a galfenol nanoparticle, in accordance with at least one implementation.

DETAILED DESCRIPTION

Figure 1A:
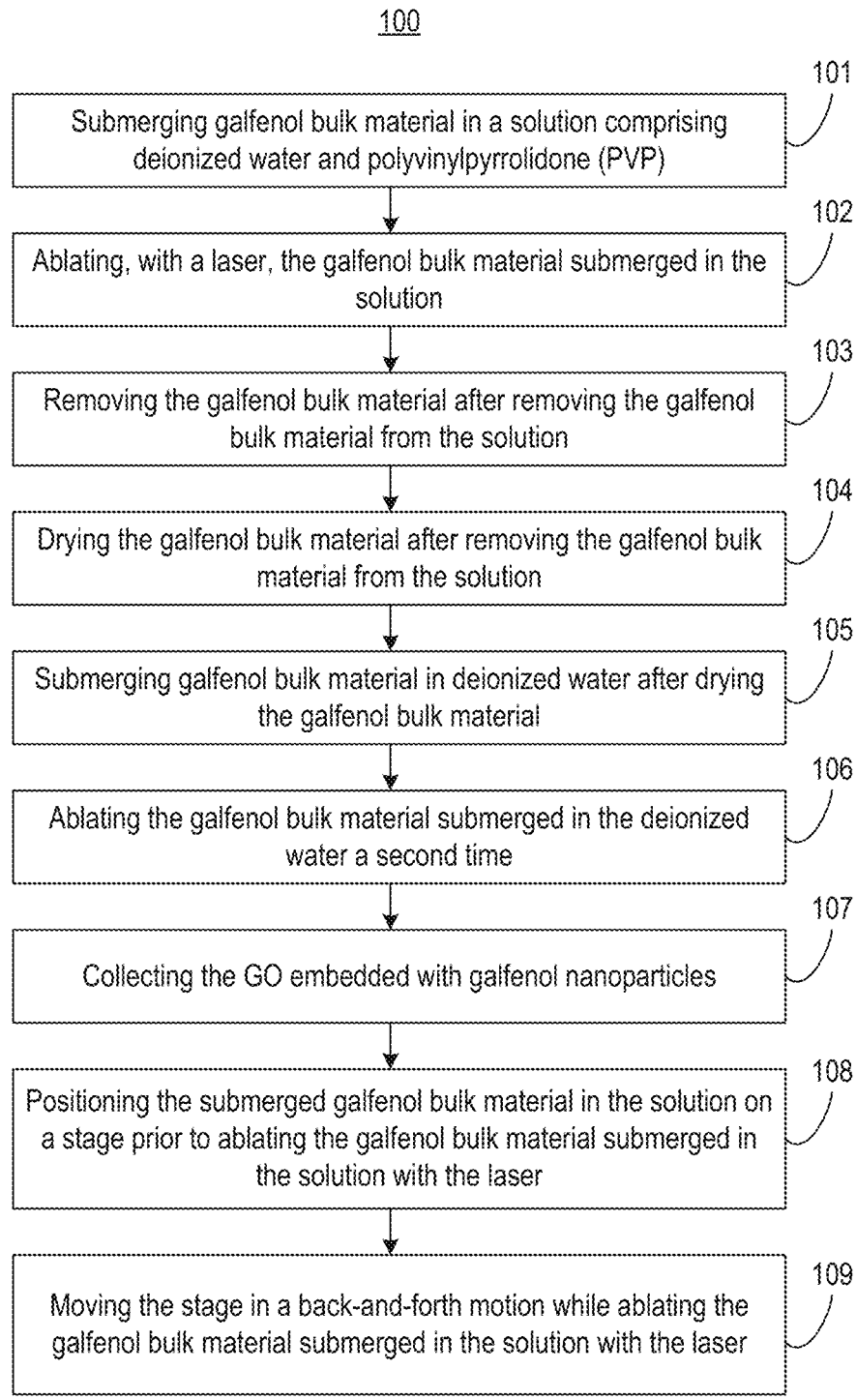
FIG. 1A illustrates a method of forming gallium-iron (Ga—Fe) nanoparticle embedded laser-induced graphene, in accordance with least one implementation.

At least one implementation is directed to systems and methods for producing laser-induced graphene-oxide (GO) with embedded galfenol nanoparticles (e.g., galfenol nanoparticles embedded in few-layer graphene oxide). While various implementations herein are illustrated for producing gallium-iron (Ga—Fe) nanoparticle embedded laser-induced graphene, methods and apparatus discussed herein can be used for producing other types of nanoparticle-embedded two-dimensional (2D) materials. Here, "graphene" generally refers to a single layer of carbon atoms arranged in a 2D honeycomb lattice. Graphene is highly conductive with high strength and flexibility, and can be used in electrical, thermal, and mechanical arts. Here, "galfenol" generally refers to an alloy made from iron (Fe) and gallium (Ga). Galfenol has magneto-strictive properties (e.g., galfenol can change shape when exposed to a magnetic field. Galfenol can be used in sensors, actuators, and transducers. Here, "galfenol doping" generally refers to intentional introduction of impurities or foreign atoms into galfenol to modify its properties. In some examples, galfenol is incorporated into graphene structure. In at least one implementation, doping process of galfenol into graphene can alter electrical and magnetic properties of graphene.

In at least one implementation, directly ablating gallium-iron alloy (galfenol) in a water-based solution is performed for direct synthesis of nanomaterial-embedded laser-induced few-layer graphene-oxide. In at least one implementation, nanoparticle-embedded 2D material is produced through direct laser ablation of bulk galfenol in a solvent without prior synthesis of nanoparticles.

Here, "few-layer graphene oxide" generally refers to a sheet of graphene oxide (GO) comprising less than five (5) layers. Here, "multilayer graphene" generally refers to a sheet of GO comprising between five (5) and ten (10) layers. Here, "bulk graphene" generally refers to a sheet of GO comprising more than ten (10) layers. In at least one implementation, a method of direct laser inscription of bulk galfenol in deionized (DI) water with femtosecond laser ablation is performed to produce laser-induced few-layer or multilayer graphene-oxide (GO) embedded with galfenol nanoparticles (NP).

In at least one implementation, a process comprising irradiating a near-infrared (near-IR) femtosecond laser at, for example, 1040 nm, on a bulk galfenol material submerged in a solution comprising DI water and a small concentration (e.g., 5%/wt.) of polyvinylpyrrolidone (PVP) followed by a second ablation in pure DI water is performed to achieve nanoparticle-embedded GO. In at least one implementation, nanoparticles with a mean diameter of, for example, approximately 30 nm are embedded in GO sheets with visible folds spaced at, for example, approximately 0.63 nm. In at least one implementation, composition of iron and gallium shifts by, for example, less than 2% during a laser ablation process, and the few-layer GO sheets exhibit similar Raman peaks to bulk graphite. Here, "laser ablation" generally refers to a process where intense bursts of energy delivered by a short laser pulse are used to sample or remove a portion of a material. In at least one implementation, method of ablating a bulk material in a solution containing polyvinylpyrrolidone (PVP) creates a few-layer graphene and nanoparticles simultaneously.

There are many technical effects of method and apparatus discussed herein. In at least one implementation, graphene embedded with galfenol oxide nanoparticles can be used as an anode material for the creation of lithium-ion supercapacitors. In at least one implementation, energy density, power density, longevity, and voltage range of supercapacitors can be enhanced by graphene embedded with galfenol oxide nanoparticles. In at least one implementation, method of embedding nanoparticles is a greener method as it does not use a synthesis of film chemical contamination, high processing temperatures, or a harsh chemical etching agent. In at least one implementation, methods discussed herein produce both graphene and embedded nanoparticles using same femtosecond laser without need for separate synthesis methods. In at least one implementation, graphene embedded with galfenol oxide nanoparticles is used as thin film for flexible electronics. In at least one implementation, graphene embedded with galfenol oxide nanoparticles can be used to create conductive layers that block electromagnetic interference. In at least one implementation, generated nanoparticles-embedded graphene dispersed in a deionized (DI) water solution creates a water-based ink that can be applied printing. In at least one implementation, combination of graphene's excellent electrical conductivity and galfenol's magnetostrictive properties can be used in sensitive sensors, particularly for detecting changes in magnetic fields. In at least one implementation, galfenol doped graphene's (GDG) magnetostrictive behavior can be harnessed in actuators and devices that convert electrical signals into mechanical motion. In at least one implementation, graphene embedded with galfenol oxide nanoparticle's magneto-strictive behavior can be harnessed in actuators and devices that convert electrical signals into mechanical motion. In at least one implementation, graphene embedded with galfenol oxide nanoparticle's magneto-strictive behavior can be harnessed in actuators and devices that convert electrical signals into mechanical motion. Other technical effects can be gleaned from various implementations and figures discussed herein.

In the following description, numerous details are discussed to provide a more thorough explanation of implementations of the present disclosure. It will be apparent, however, to one skilled in the art, that an implementation of the present disclosure may be practiced without these specific details. In other instances, well-known structures and devices are shown in block diagram form, rather than in detail, to avoid obscuring implementations of the present disclosure.

In some instances, well-known methods and devices are shown in block diagram form, rather than in detail, to avoid obscuring present disclosure. Reference throughout this specification to "an implementation" or "one implementation" or "some implementations" means that a particular feature, structure, function, or characteristic described in connection with an implementation is included in at least one implementation. Thus, appearances of phrase "in an implementation" or "in one implementation" or "some implementations" in various places throughout this specification are not necessarily referring to same implementation of disclosure. Furthermore, particular features, structures, functions, or characteristics may be combined in any suitable manner in one or more implementations. For example, a first implementation may be combined with a second implementation anywhere particular features, structures, functions, or characteristics associated with two implementations are not mutually exclusive.

FIG. 1A illustrates method 100 of forming gallium-iron (Ga—Fe) nanoparticle embedded laser-induced graphene, in accordance with least one implementation. While various blocks of method 100 are illustrated in a particular order, in at least one implementation, order can be modified. For example, some processes can be performed before others and some processes may be performed simultaneously. In at least one implementation, hardware, software, or a combination of them can be used to perform method 100. While method 100 is illustrated for gallium-iron (Ga—Fe) nanoparticle embedded laser-induced graphene, methods and apparatus discussed herein can be used for producing other types of nanoparticle-embedded 2D materials. For example, methods discussed herein can be used to embed nanoparticles such as gold and platinum in graphene. In at least one implementation, nanoparticles can be embedded in other 2D materials such as $MoS_2$.

Method 100 of embedding galfenol nanoparticles within a few layers of graphene is more environmentally conscious than other methods. For example, method 100 may not use synthesis and ablation of a film, chemical contamination, high processing temperatures, or a harsh chemical etching agent. In at least one implementation, method 100 produces GO and embedded galfenol nanoparticles using a femtosecond laser without need for a separate synthesis process or method.

At block 101, in at least one implementation, any suitable technique submerges galfenol bulk material in a first solution comprising deionized water and polyvinylpyrrolidone (PVP). In at least one implementation, galfenol bulk material comprises 2 g of galfenol bulk material. In at least one implementation, first solution of deionized water and PVP comprises 25 mL of deionized water and 1.25 g of PVP. In at least one implementation, first solution of deionized water and PVP comprises approximately 5% per weight of PVP.

At block 102, in at least one implementation, a laser ablates galfenol bulk material submerged in first solution. In at least one implementation, ablating galfenol bulk material submerged in first solution with laser comprises ablating galfenol bulk material for at least 2 minutes (e.g., about ten (10) minutes). In at least one implementation, duration of ablation can be adjusted based on yield targets and/or laser power. In at least one implementation, laser has a power of about 3 W and is configured to send laser beams at a repetition of about 1 MHz. In at least one implementation, laser comprises a near-infrared femtosecond laser at about 1,040 nm. In at least implementation, laser ablation at surface of galfenol bulk material creates a mixture of graphene and nanoparticles, and this mixture sticks or resides on surface of galfenol bulk material.

At block 103, in at least one implementation, galfenol bulk material with surface mixture of graphene and nanoparticles is removed from first solution.

At block 104, in at least one implementation, a drying process or mechanism (e.g., air drying) dries galfenol bulk material with surface mixture of graphene and nanoparticles. After first solution remnants from galfenol bulk material with surface mixture of graphene and nanoparticles dries up, a second ablation process is set up. In at least one implementation, galfenol bulk material with surface mixture of graphene is air dried at room temperature. In at least one implementation, galfenol bulk material with surface mixture of graphene is forced dried at room temperature.

At block 105, in at least one implementation, dried galfenol bulk material with surface mixture of graphene and nanoparticles is submerged in a second solution comprising deionized water. In at least one implementation, submerging galfenol bulk material in deionized water further comprises positioning galfenol bulk material with surface mixture of graphene in a petri dish with about 25 mL of deionized water.

At block 106, in at least one implementation, laser ablates, for a second time, galfenol bulk material with surface mixture of graphene submerged in deionized water. In at least one implementation, ablating galfenol bulk material for a second time with surface mixture of graphene submerged in deionized water comprises ablating galfenol bulk material with surface mixture of graphene for at least 2 minutes (e.g., about ten (10) minutes). In at least one implementation, application of laser for the second time generates graphene in deionized water. In at least one implementation, application of laser on galfenol bulk material with surface mixture of graphene submerged in deionized water results in galfenol nanoparticles that are embedded in graphene which disperses in deionized water. In at least one implementation, nanoparticles embedded in graphene disperse from surface mixture of graphene when hit by a laser beam.

At block 107, in at least one implementation, GO embedded with galfenol nanoparticles is collected. In at least one implementation, collecting GO embedded with galfenol nanoparticles comprises removing galfenol bulk material from container and transferring remaining solution to a sealed vessel.

At block 108, in at least one implementation, submerged galfenol bulk material with surface mixture of graphene is positioned in solution on a stage prior to ablating galfenol bulk material submerged in solution with laser. At block 109, in at least one implementation, stage is moved in a back-and-forth motion while ablating galfenol bulk material submerged surface mixture of graphene in second solution with laser. In at least one implementation, stage comprises a motorized linear stage. In at least one implementation, moving stage in a back-and-forth motion comprises moving stage at approximately 2.6 mm/second.

In at least one implementation, method 100 is more cost-effective, more ecofriendly, and may not use chemical synthesis, contaminants, a controlled environment, or post-processing as the prior processes for forming graphene-oxide (GO) embedded with gallium-iron alloy (galfenol) nanoparticles.

Figure 1B:
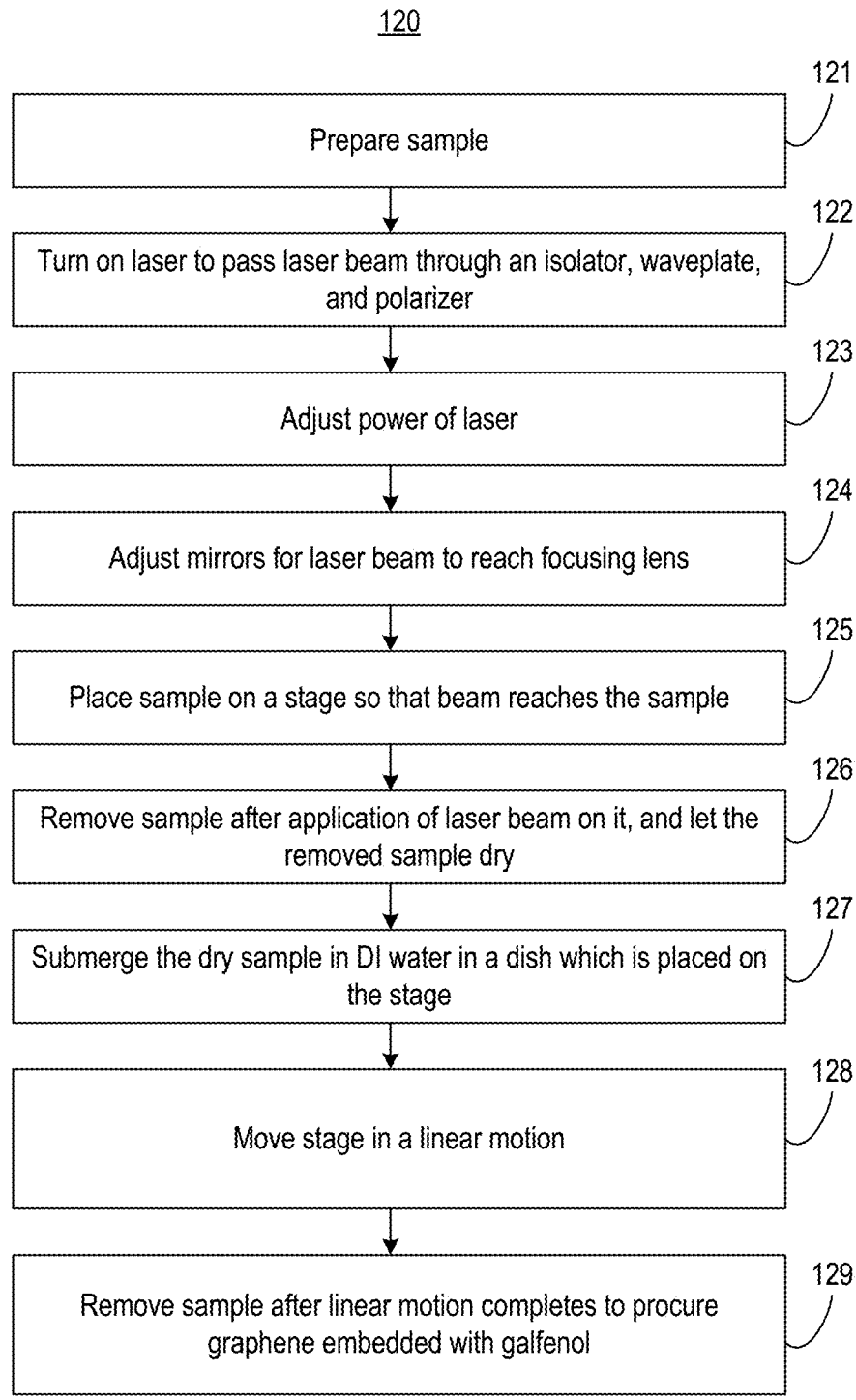
FIG. 1B illustrates a method of forming Ga—Fe nanoparticle embedded laser-induced graphene, in accordance with least one implementation.

FIG. 1B illustrates method 120 of forming gallium-iron (Ga—Fe) nanoparticle embedded laser-induced graphene, in accordance with least one implementation. While various blocks of method 120 are illustrated in a particular order, in at least one implementation, order can be modified. For example, some processes can be performed before others and some processes may be performed simultaneously. In at least one implementation, hardware, software, or a combination of them can be used to perform method 120. While method 120 is illustrated for gallium-iron (Ga—Fe) nanoparticle embedded laser-induced graphene, methods and apparatus discussed herein can be used for producing other types of nanoparticle-embedded 2D material.

At block 121, in at least one implementation, sample is prepared. In at least one implementation, sample comprises a galfenol sample. In at least one implementation, galfenol (e.g., $Fe_{81.6}Ga_{18.4}$ with a density of 7,800 kg/m$^3$) has a clean flat surface and weight of 2 g. In at least one implementation, sample is submerged in container having a solution comprising deionized water and polyvinylpyrrolidone. In at least one implementation, 2 g of galfenol is submerged in 25 ml of deionized water and 1.25 g (e.g., 5% weight) of polyvinylpyrrolidone (hydrocarbon) in a petri dish. In at least one implementation, galfenol has a form of a block, pellet, or ball. In at least one implementation, petri dish is set up on a motorized linear stage that is programed to move right to left and left to right (e.g., linearly) at a suitable speed (e.g., 2.6 mm/s).

At block 122, in at least one implementation, a laser is set up and tuned on to pass a laser beam through an apparatus (e.g., system 200, system 220, or system 300 discussed with reference to FIG. 2A, FIG. 2B, and FIG. 3). In at least one embodiment, apparatus includes an isolator, a waveplate, and a polarizer in path of laser beam. In at least one implementation, laser beam passes through an isolator. In at least one implementation, isolator prevents back reflections.

In at least one implementation, laser passes through a half waveplate and polarizer. In at least one implementation, half waveplate and/or polarizer control energy and hence power of laser beam as it passes through them. At block 123, in at least one implementation, laser power is adjusted to control yield of gallium-iron (Ga—Fe) nanoparticle embedded laser-induced graphene generation. In at least one implementation, laser power or energy is adjusted by half waveplate and/or polarizer to control yield of gallium-iron (Ga—Fe) nanoparticle embedded laser-induced graphene generation.

At block 124, in at least one implementation, one or more mirrors are setup to direct beams towards a focusing lens. In at least one implementation, focusing lens is a plano-convex lens with a focal length that directs or focuses laser beam directly on sample. In at least one implementation, focusing lens has a focal length of 7.5 cm. At block 125, in at least one implementation, sample is set up at a distance equal to focal length (e.g., 7.5 cm) below or in front of focusing lens on stage. In at least one implementation, laser beam falls perpendicular to a plane of stage. In at least one implementation, stage movement is orthogonal to direction of laser beam. In at least one implementation, stage is a flat surface. In at least one implementation, stage is configured to move along x or y direction while laser beam falls on stage along a z direction, where x and y directions are orthogonal to z direction. In at least one implementation, focal point of laser is determined where a bright light reflects off surface of sample (e.g., bulk galfenol material) as sample moves up and down along z-direction. In at least one implementation, visible clouds of nanoparticles appear in solution comprising deionized water and polyvinylpyrrolidone.

In at least one implementation, in first ablation process, after laser beam is focused sample, and stage moves back and forth perpendicular to laser beam, a mixture of graphene and nanoparticles are formed over sample of bulk galfenol material. In at least one implementation, at surface of galfenol, initially, a nanoplasma is formed that is a mixture of water ions, galfenol ions and carbon ions. In at least one implementation, the generated graphene adheres to the galfenol surface where the laser beam is focused. In at least one implementation, stage is configured to move back and forth perpendicular to laser beam such that laser beams scans or falls on entire surface of sample to avoid producing craters in sample. Craters or other irregularities can disturb precise focus of incident light generated by laser, which in turn may affect yields and material quality of mixture of graphene and nanoparticles.

At block 126, in at least one implementation, after laser ablation, galfenol with mixture of graphene and nanoparticles on its surface is removed from container. In at least one implementation, removed galfenol with mixture of graphene and nanoparticles is left to dry (e.g., air dry or blow dry at room temperature). At block 127, in at least one implementation, dried galfenol with mixture of graphene and nanoparticles on its surface is then submerged in a second solution is a container. In at least one implementation, second solution is deionized water (e.g., pure deionized water). In at least one implementation, galfenol with mixture of graphene and nanoparticles on its surface is placed in a glass petri dish with 25 mL pure deionized water solution and ablated for at least 2 minutes (e.g., for 10 minutes) with identical parameters as in first ablation process.

At block 128, in at least one implementation, stage is again moved in a linear motion relative to perpendicular laser beam. In at least one implementation, laser beam focuses on mixture of graphene and nanoparticles on surface of galfenol, and laser ablation occurs. In at least one implementation, laser ablation causes graphene to disperse in DI water. In at least one implementation, galfenol nanoparticles are now embedded in graphene as graphene disperses from surface of galfenol bulk material upon second ablation. At block 129, galfenol bulk material is removed from second solution which now includes graphene sheets with embedded nanoparticles. In at least one implementation, solution with graphene sheets with embedded nanoparticles can be used with MEMS devices and other semiconductor manufacturing processes.

Figure 1C:
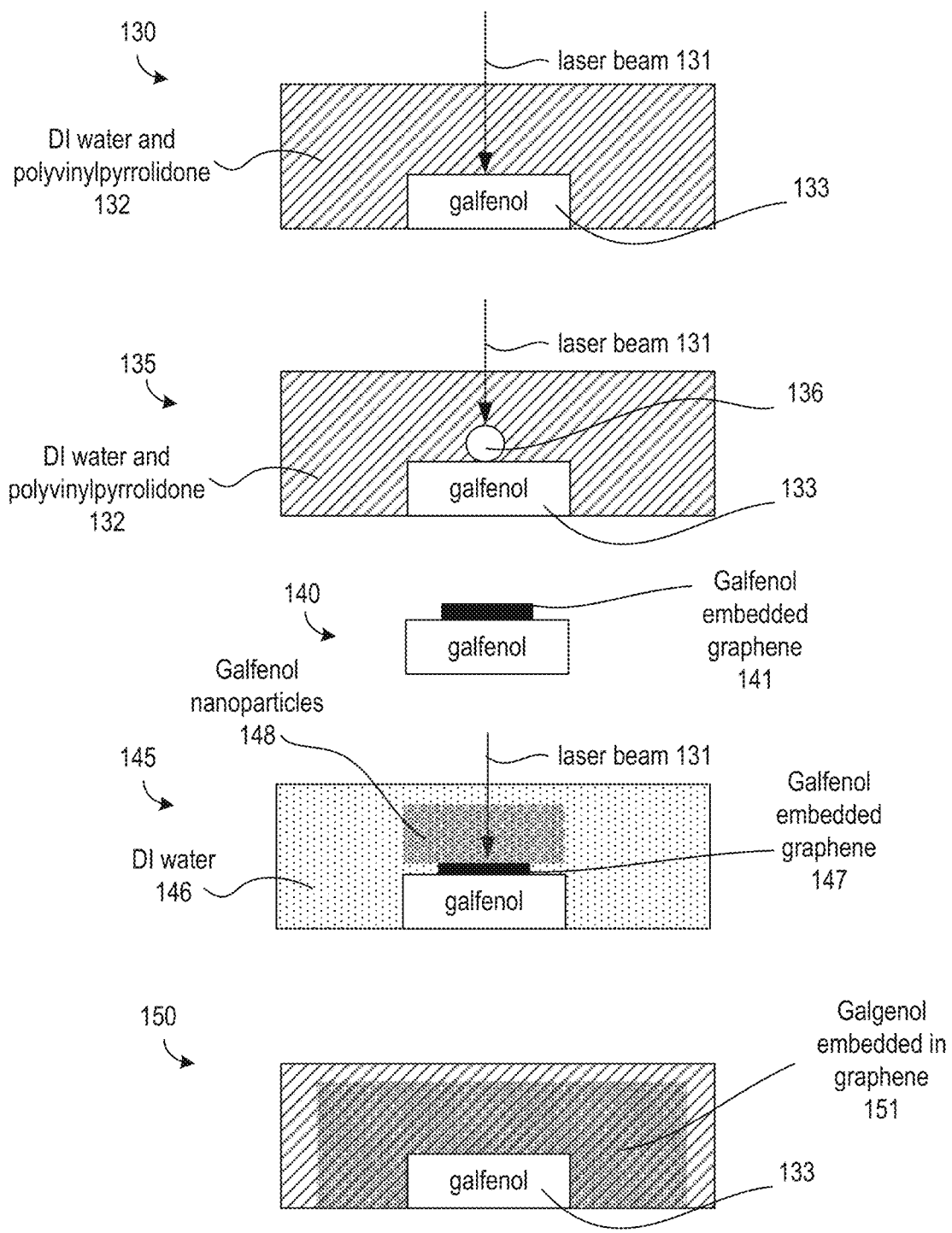
FIG. 1C illustrates a method of forming Ga—Fe nanoparticle embedded laser-induced graphene, in accordance with least one implementation.

FIG. 1C illustrates a method of forming gallium-iron (Ga—Fe) nanoparticle embedded laser-induced graphene, in accordance with least one implementation. Method of FIG. 1C is illustrated as physical renditions 130, 135, 140, 145, and 150 of method 100 and/or method 120. Rendition 130 illustrates bulk galfenol 133 submerged in a first solution of DI water and polyvinylpyrrolidone (polymer) 132, where top surface of galfenol 133 is ablated by laser beam 131, in accordance with at least one implementation. In at least one implementation, polyvinylpyrrolidone may be replaced with a similar hydrocarbon hyaluronate.

Rendition 135 illustrates formation of a mixture of graphene and nanoparticles after laser ablation (first laser ablation) from laser beam 131. In at least one implementation, stage with container having bulk galfenol 133 submerged in first solution moves in x or y direction while laser beam 131 remains fixed, perpendicular to top surface of galfenol 133. In at least one implementation, stage is fixed and laser beam 131 is moved along an entire top surface of galfenol 133. In at least one implementation, laser beam 131 and stage move to allow laser beam eventually to cover entire surface of galfenol 133 faster. In at least one implementation, at surface of bulk galfenol, initially a nanoplasma is formed by laser beam 131, where nanoplasma is a mixture of water ions, galfenol ions, and carbon ions. In at least one implementation, graphene 136 generated from ablation sticks on top surface of bulk galfenol where laser beam is focused.

Rendition 140 illustrates removal of galfenol bulk material along with mixture of graphene and nanoparticles 141 on surface of galfenol bulk material, where mixture of graphene and nanoparticles 141 is galfenol embedded graphene. In at least one implementation, removed galfenol bulk material along with mixture of graphene and nanoparticles 141 from first solution and allowed to dry where water and other solvents evaporate.

Rendition 145 illustrates submerging dried galfenol bulk material with mixture of graphene and nanoparticles 147 into a second solution of DI water 146. In at least one implementation, second laser ablation process is performed again with same parameters as first laser ablation. In at least one implementation, laser beam 131 focuses in DI water 146 where graphene disperses in water from surface of bulk galfenol and galfenol nanoparticles 148 are formed which are embedded in graphene.

Rendition 150 illustrates a case after second ablation completes (e.g., after at least 2 minutes of laser beam 131 on galfenol embedded graphene), in accordance with at least one implementation. In at least one implementation, galfenol embedded in graphene 151 floats in second solution above bulk galfenol 133. In at least one implementation, bulk galfenol 133 is removed and second solution with thin 2D films of graphene with embedded nanoparticles is collected.

In at least one embodiment, methods 100 and 120, and renditions 130, 135, 145, and 150 produce a form of galfenol doped graphene (GDG). In at least one implementation, GDG is a composition of matter which is created by combining graphene, a two-dimensional material, with galfenol, an alloy comprising iron and gallium. In at least one implementation, GDG combines unique properties of both graphene and galfenol, resulting in a composite material. In at least one implementation, combination of graphene and galfenol is not a naturally occurring substance but a synthesized composite designed to leverage properties of each component for various applications. In at least one implementation, size of galfenol particles in GDG are controllable by incident laser energy. In at least one implementation, ratio of galfenol to graphene composition is varied by amount of polymer present in sample and ablation time of laser and speed lateral linear motion of stage.

Figure 2A:
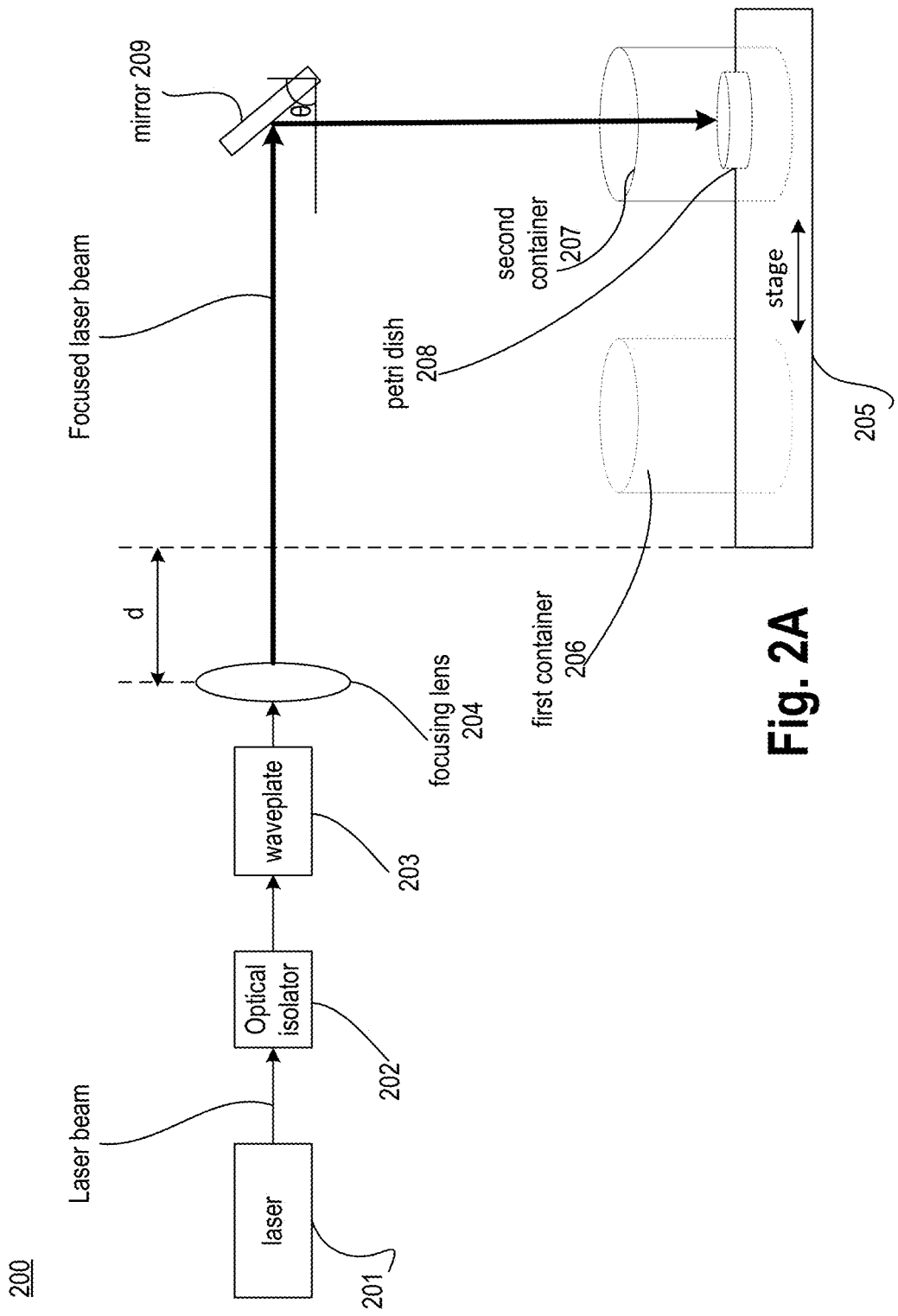
FIG. 2A illustrates a system for laser-induced graphene-oxide production, in accordance with at least one implementation.

FIG. 2A illustrates system 200 for laser-induced graphene-oxide production, in accordance with at least one implementation. In at least one implementation, system 200 comprises a number of components configured to produce graphene-oxide. In at least one implementation, system 200 comprises laser 201, optical isolator 202, waveplate 203, focusing lens 204, stage 205, first container 206, second container 207, petri dish 208, and mirror 209. In at least one implementation, system 200 is operated at standard atmospheric environment (20° C. and normal pressure).

In at least one implementation, laser 201 comprises a near-infrared femtosecond laser (e.g., laser emitting 1040 nm laser beam with a duration of 400 femtoseconds, 100 MHz laser). In at least one implementation, laser 201 operates at a power of 3 W with a repetition of 1 MHz. In at least one implementation, power of laser 201 can be increased to increase yield of graphene sheets with embedded nanoparticles. In at least one implementation, optical isolator 202 is poised along a laser flow path. In at least one implementation, laser flow path is a path from laser 201, through focusing lens 204, and to stage 205.

In at least one implementation, optical isolator 202 is positioned between laser 201 and focusing lens 204. In at least one implementation, optical isolator 202 prevents back reflection of laser beam. In at least one implementation, waveplate 203 is a half waveplate which is positioned along laser flow path. In at least one implementation, waveplate 203 is positioned between optical isolator 202 and focusing lens 204. In at least one example, waveplate 203 is a half waveplate. In at least one implementation, focusing lens 204 (e.g., Thorlabs® uncoated plano-convex lens) has a focal distance of approximately 7.5 cm. In at least one implementation, distance 'd' between focusing lens 204 and stage is about 6.99 cm. In at least one implementation, mirror 209 changes beam direction to be perpendicular to x-y surface of stage 205 to allow beam to fall directly on top surface of sample in petri dish 208 (in first container 206 and/or second container 207). In at least one implementation, mirror 209 has an angle θ of 45 degrees relative to beam from focusing lens 204.

In at least one implementation, stage 205 is a three-dimensional linear motion stage which can move along direction of arrows shown. In at least one example, linear motion causes container on stage 205 to move back and forth along one axis. In at least one example, stage 205 is configured to move linearly in a back-and-forth motion at 2.6 mm/second. In at least one implementation, stage 205 is a motorized linear stage. In at least one implementation, stage 205 can move in x or y (or both) directions while laser beam falling towards container on stage is perpendicular to motion in x or y direction.

In at least one example, stage 205 holds or provides a platform for positioning first container 206. In at least one implementation, first container 206 is initially placed on stage 205. In at least one example, first container 206 contains galfenol bulk material in a solution comprised of deionized water and polyvinylpyrrolidone (PVP). In at least one implementation, laser 201 ablates galfenol bulk material in first container 206. In at least one implementation, solution comprises approximately 5% per weight of PVP. In at least one implementation, laser 201 focuses on sample in first container 206 (or second container 207) through waveplate 203 for precise power control. In at least one example, sample is a 2 g bulk of galfenol submerged in a 25 mL of DI water and 1.25 g (5%/wt.) of PVP solution, where graphene is from PVP. In at least one implementation, laser light from laser 201 focuses directly on bulk galfenol at a point where a bright white light reflects off surface of bulk material. At this focus, visible clouds of nanoparticles appear in the solution, in accordance with at least one implementation. In at least one implementation, laser 201 has a power of 3 W with a repetition of 1 MHz which allows for ablation of sample occurring for about 10 minutes. In at least one implementation, during ablation, sample moves in a back-and-forth motion, scanning laser light over sample material's surface with assistance from stage 205. In at least one implementation, stage 205 moves in a linear motion to avoid producing craters on surface and disrupting incident light's focus from focusing lens 204. In at least one implementation, after initial ablation in first container 206, sample is removed from solution and left to dry.

In at least one implementation, second container 207 is positioned on stage 205 after first container 206 is removed from stage 205. In at least one implementation, first container 206 and then second container 207 are under laser beam. In at least one implementation, second container 207 replaces first container 206 and uses same location as previously used by first container 206 so that laser beam falls on sample in second container 207. In at least one implementation, second container 207 contains ablated galfenol bulk material and deionized water. In at least one implementation, laser 201 ablates galfenol bulk material in second container 207 to form GO embedded with galfenol nanoparticles. In at least one example, second container 207 comprises petri dish 208 containing the ablated galfenol bulk material and 25 mL of deionized water. In at least one implementation, petri dish 208 is a glass petri dish. In at least one implementation, sample after ablation is taken out of the first container 206, then dried and transferred to petri dish 208 with a 25 mL solution of pure DI water, and ablated a second time (e.g., 10 minutes) with identical parameters used in previous ablation process. In at least one implementation, bulk is removed from petri dish 208, and remaining colloidal solution of nanoparticles and DI water is transferred to a sealed glass vessel.

In at least one implementation, distance 'd' is selected to ensure consistent nanoparticle and graphene production. For example, if focused light from focusing lens 204 is not meeting material in first container 206 (and later in second container 207) at focus plane, spot size on sample may be much larger and therefore laser power incident on the sample may be less intense as it is being spread over a larger surface area. As light travels from air to water it diffracts because of entering a material of higher refractive index. This causes beams of light to travel a further distance. In at least one implementation, it may be useful to know level of water above sample and distance of focusing lens 204 from sample in first container 206 and then later in second container 207. In at least one implementation, depth of water over sample is about 1 cm. In one example, assuming refractive index of 1.00 for air and 1.33 for deionized water with 1040 nm light using Snell's law, concludes that actual distance traveled in 1 cm of water is approximately 1.513 cm. Therefore, if focal distance of lens is 7.5 cm, distance between focusing lens 204 and sample may be approximately 6.99 cm for this example.

In at least one implementation, magnetostrictive properties of GO embedded with galfenol nanoparticles can be used in micro-electromechanical systems (MEMS) for wearable, high-performance, non-restricting flexible electronics, etc. GO embedded with galfenol nanoparticles can be used for micro-supercapacitors (MSCs). Due to the high energy density, high power density, and a long cycle time over a wide voltage range exhibited by the galfenol, GO embedded with galfenol nanoparticles can be used for a number of MEMS applications.

Figure 2B:
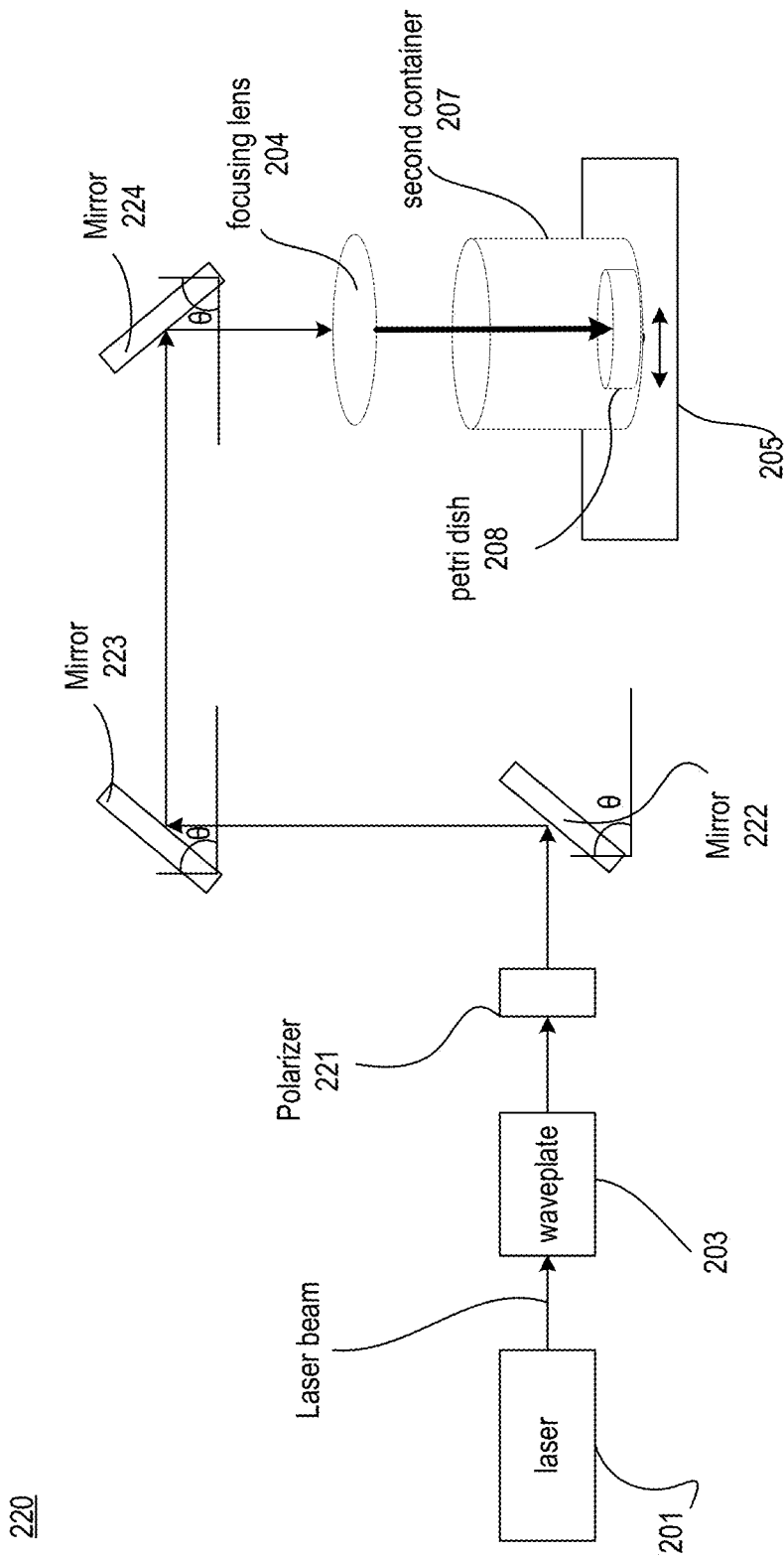
FIG. 2B illustrates a system for laser-induced graphene-oxide production, in accordance with at least one implementation.

FIG. 2B illustrates system 220 for laser-induced graphene-oxide production, in accordance with at least one implementation. In at least one implementation, system 220 comprises laser 201, waveplate 203, stage 205, focusing lens 204, second container 207, petri dish 208, polarizer 221, mirror 222, mirror 223, and mirror 224. In at least one implementation, optical isolator 202 is placed between laser 201 and waveplate 203 to prevent back reflection of laser beam (e.g., back to laser 201). In at least one implementation, laser beam passes through a waveplate 203 (e.g., half waveplate) and polarizer 221 that is used to precisely control energy of laser beam. In at least one implementation, one or more mirrors (e.g., mirrors 222, 223, and 224) are used to direct laser beam to focusing lens 204. In at least one implementation, sample in petri dish 208 is set up at focal length distance from focusing lens 204 below or in front of focusing lens on stage 205. In at least one implementation, laser beam falls perpendicular to a plane of stage 205. In at least one implementation, movement of stage 205 is orthogonal to direction of laser beam from focusing lens 204. In at least one implementation, stage 205 is a flat surface. In at least one implementation, stage 205 is configured to move along x or y direction while laser beam falls on stage along a z direction, where x and y directions are orthogonal to z direction. In at least one implementation, focal point of laser beam is determined where a bright light reflects off surface of sample (e.g., bulk galfenol material) as sample moves up and down along z-direction. In at least one implementation, when or where bright light reflects off surface of sample, visible clouds of nanoparticles appear in solution in second container 207 comprising deionized water and polyvinylpyrrolidone.

Figure 3:
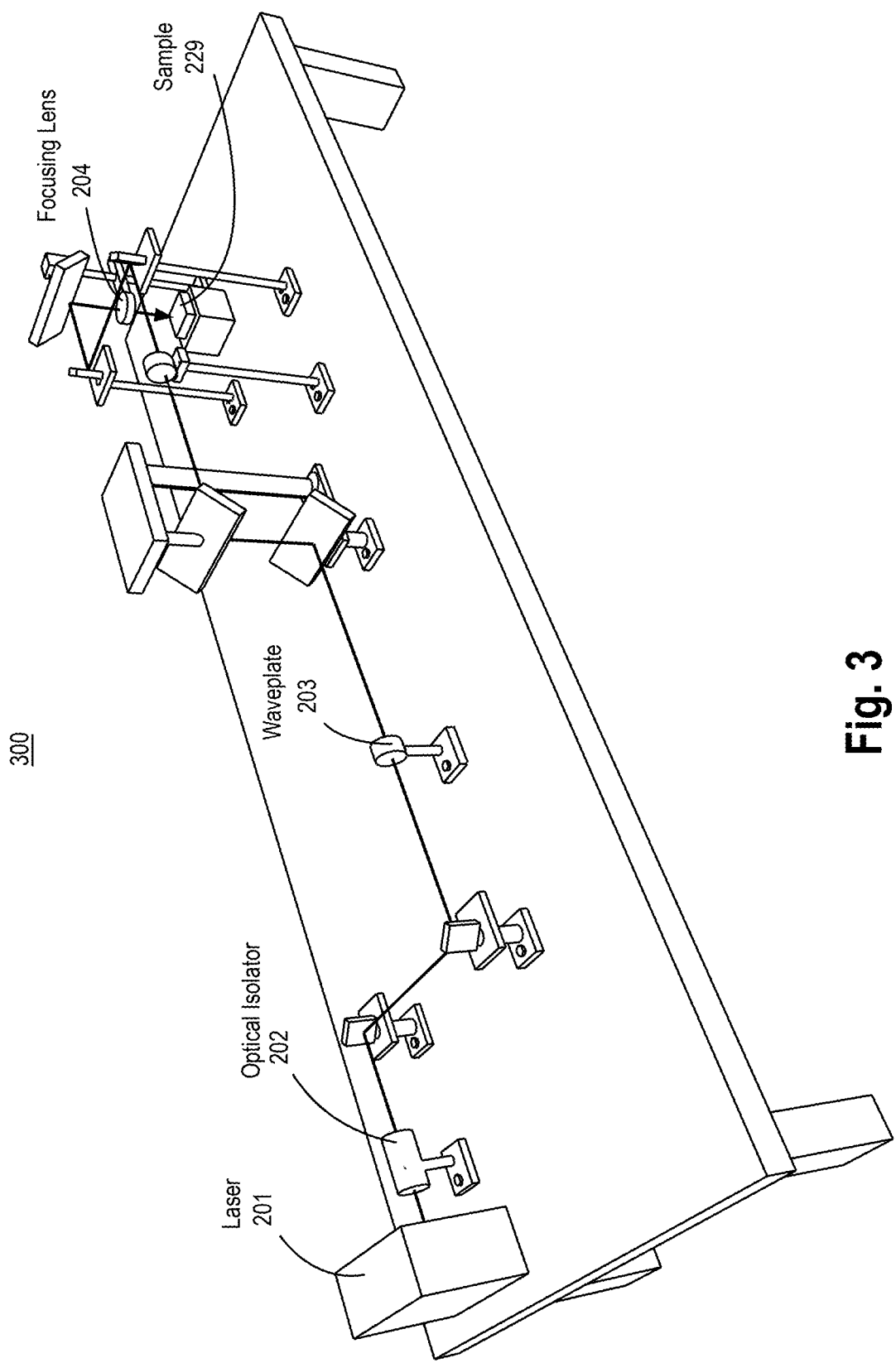
FIG. 3 illustrates a system for laser-induced graphene-oxide production, in accordance with at least another implementation.

FIG. 3 illustrates system 300 for laser-induced graphene-oxide production, in accordance with at least one implementation. Compared to FIG. 2A, here laser path is shown going through a set of reflectors before reaching focusing lens 204. Here, petri dish 208 contains sample (e.g., ablated galfenol bulk material and 25 mL of deionized water). While system 200, 220, and 300 illustrate one laser beam from focusing lens to sample, more laser beams can be used simultaneously to increase yield of laser-induced graphene-oxide production. In at least one implementation, two or three beams on sample at same time can increase production of galfenol nanoparticles embedded in graphene. In at least one implementation, system 200, 220, and/or 300 can include a beam splitter that splits laser beam into two or more laser beams. In at least one implementation, these two or more laser beams are then passed through corresponding two or more focusing lens that result in laser beams falling on different locations of sample to ablate sample at different locations simultaneously. In at least one implementation, power of laser 201 is increased when multiple laser beams are used for ablation of sample in second container 207.

Figure 4:
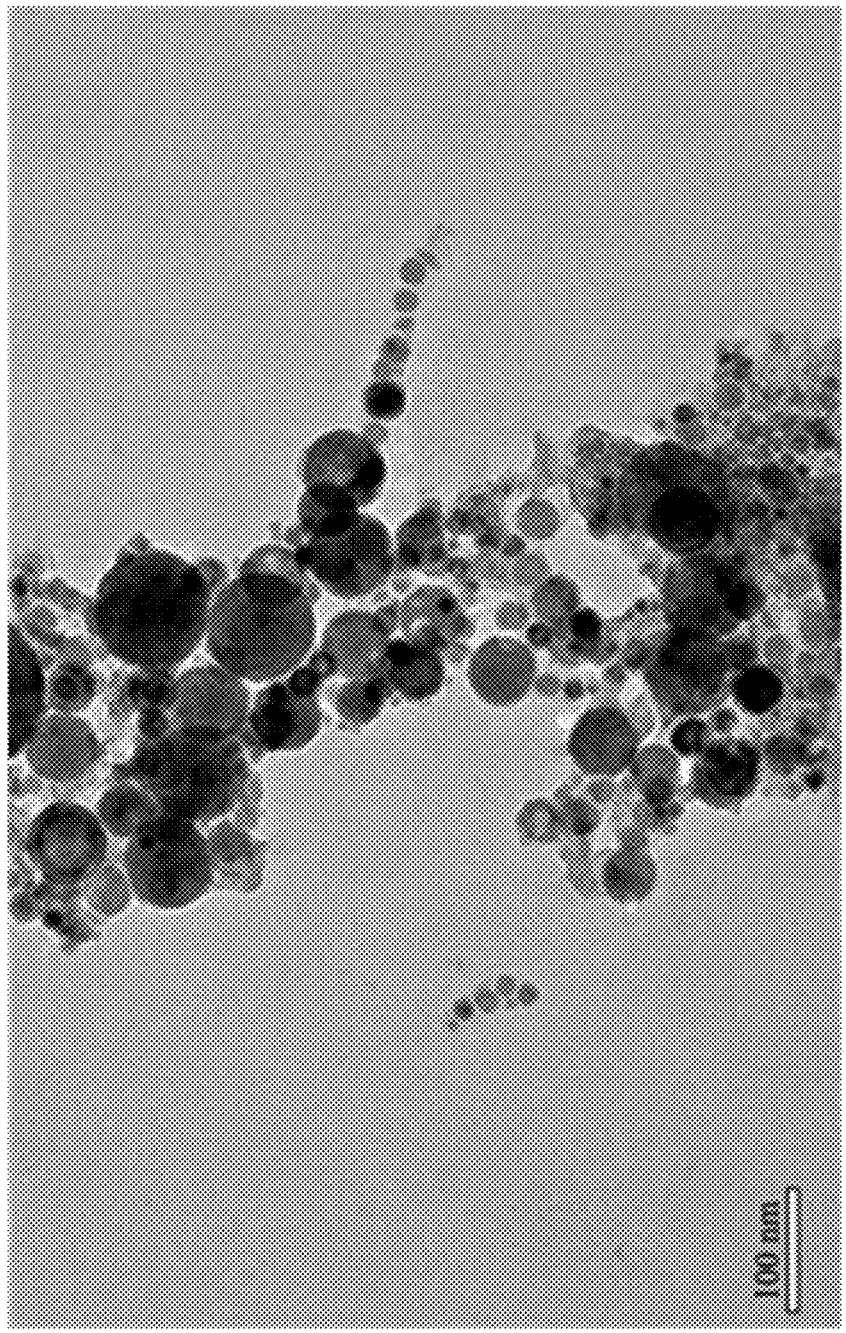
FIG. 4 illustrates a transmission electron microscope (TEM) image of galfenol nanoparticles synthesized through laser ablation in deionized (DI) water in accordance with at least one implementation.

FIG. 4 illustrates transmission electron microscope (TEM) image 400 of galfenol nanoparticles synthesized through laser ablation in deionized (DI) water, in accordance with at least one implementation.

Figures 5A, 5B:
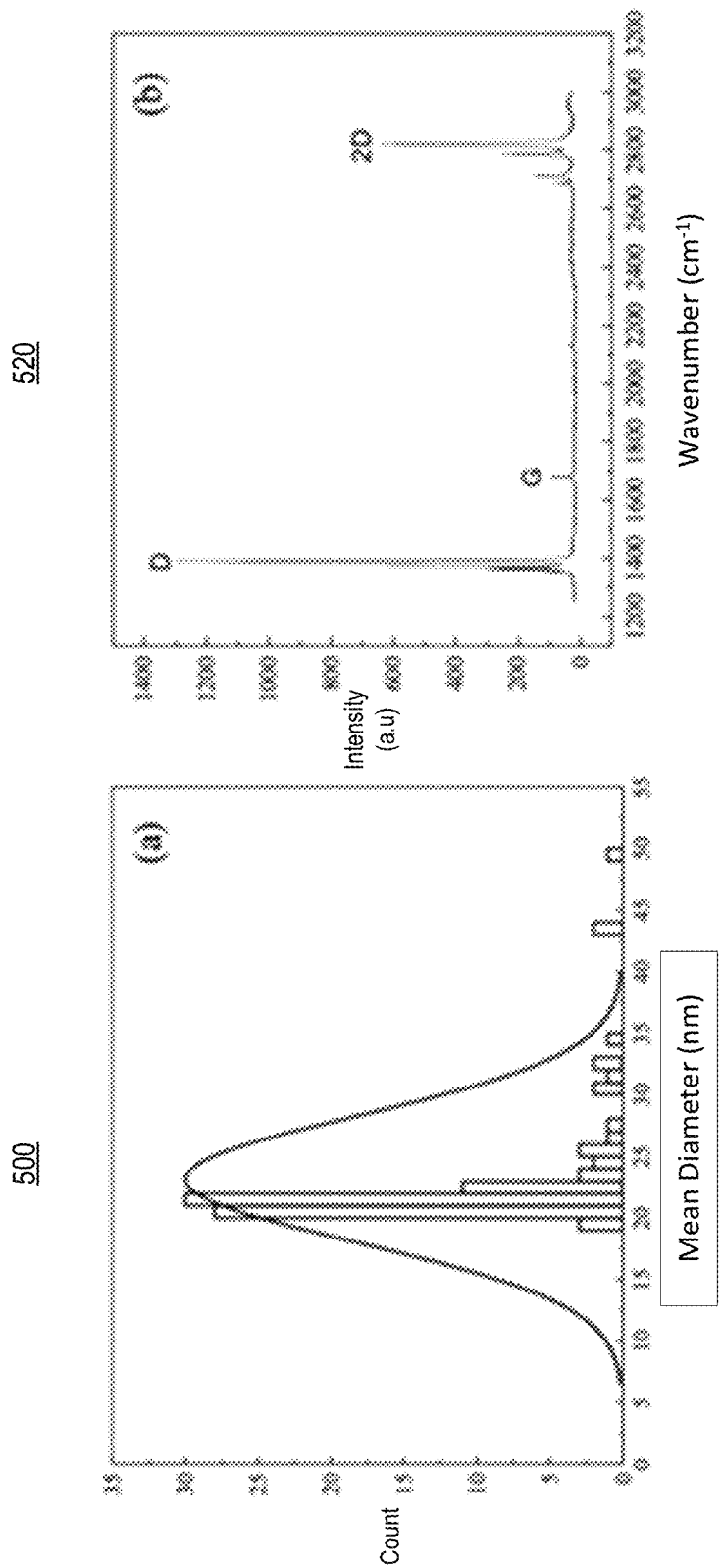
FIG. 5A is a graph that shows the hydrodynamic distribution among galfenol-oxide nanoparticles in accordance with at least one implementation.
FIG. 5B illustrates a Raman spectrum observed for graphene-oxide (GO) comprised of a few GO layers, in accordance with at least one implementation.

FIG. 5A illustrates graph 500 that shows the hydrodynamic distribution among galfenol-oxide nanoparticles in accordance with at least one implementation. In at least one implementation, a dynamic light scattering (DLS) measurement is taken to estimate average hydrodynamic diameters of the embedded nanoparticles. Distribution shows results for 100 independent trials of material at same laser fluence. Graph 500 shows that average nanoparticle sizes are consistent across all 100 samples and result in a mean effective diameter of 30.83 nm with a variance of 29.90 nm. Most galfenol-oxide nanoparticles present in sample are at or below 50 nm in diameter.

FIG. 5B illustrates Raman spectrum 520 observed for graphene-oxide (GO) comprised of a few GO layers, in accordance with at least one implementation. Raman spectrum 520 may be used to verify composition of synthesized GO layer formed from system and method discussed herein. Here, Raman measurements are carried out with a Horiba LabRAM HR Evolution at room temperature at 633 nm. A 100× objective is used to locate few-layer GO sheets. Three characteristic peaks (e.g., G-peak, D-peak, and 2D-peak) exist in Raman spectrum 520 of graphitic materials. Bulk graphite exhibits a G-peak at 1,580 $c^{-1}$ and a 2D peak at 2,700 $cm^{-1}$. Here, galfenol embedded few-layer GO exhibits a D-peak at approximately 1,380 $cm^{-1}$, G-peak at approximately 1,680 $cm^{-1}$, and a 2D-peak at approximately 2,800 $cm^{-1}$.

An XRD is also used to compare interplanar spacing in the few-layer GO with a TEM database as shown in Table 1.

TABLE 1

Interplanar spacing of few-layer graphene compared to the database

| 2 Theta | Observed Interplanar Spacing (Å) | Database Interplanar Spacing (Å) | Orientation |
|---|---|---|---|
| 24.030 | 2.270 | 2.110 | 100 |
| 34.600 | 1.980 | 2.030 | 101 |
| 42.590 | 1.810 | 1.810 | 102 |
| 49.550 | 1.330 | 1.230 | 110 |
| 55.810 | 1.110 | 1.160 | 112 |

Figure 6A:
FIG. 6A illustrates a graph of energy-dispersive x-ray spectroscopy (EDS) system data of a center of a GO nanoparticle embedded in laser-induced GO, in accordance with at least one implementation.
Figure 6B:
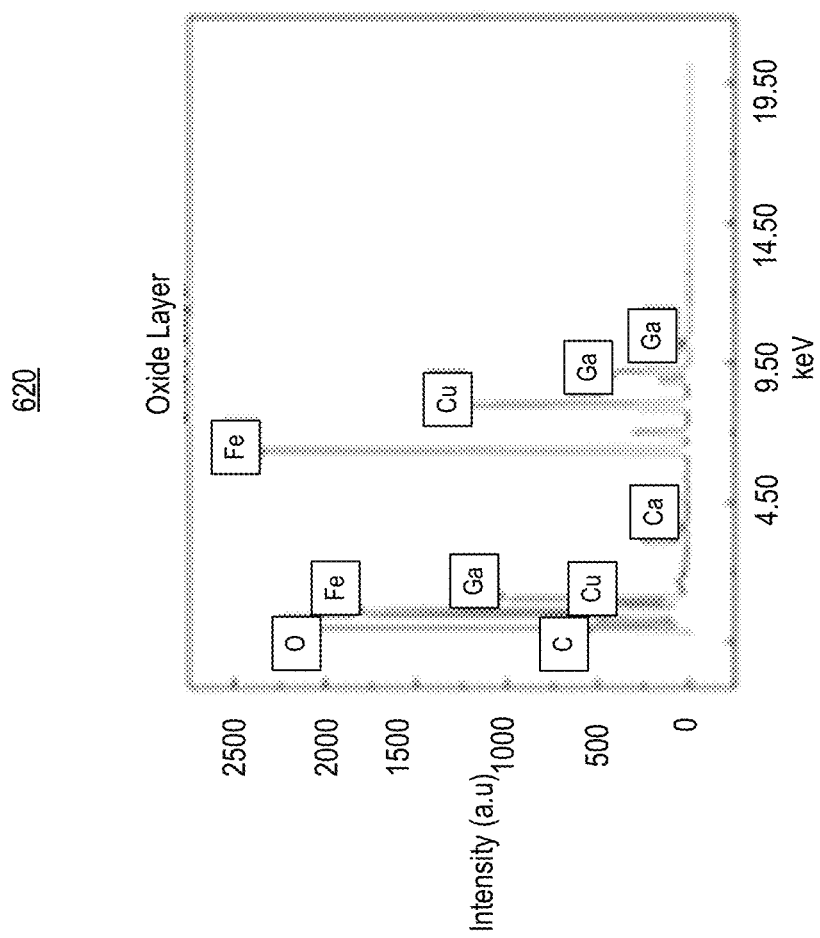
FIG. 6B illustrates a graph of EDS system data of the shell surrounding a GO nanoparticle embedded in laser-induced GO, in accordance with at least one implementation.
Figure 6C:
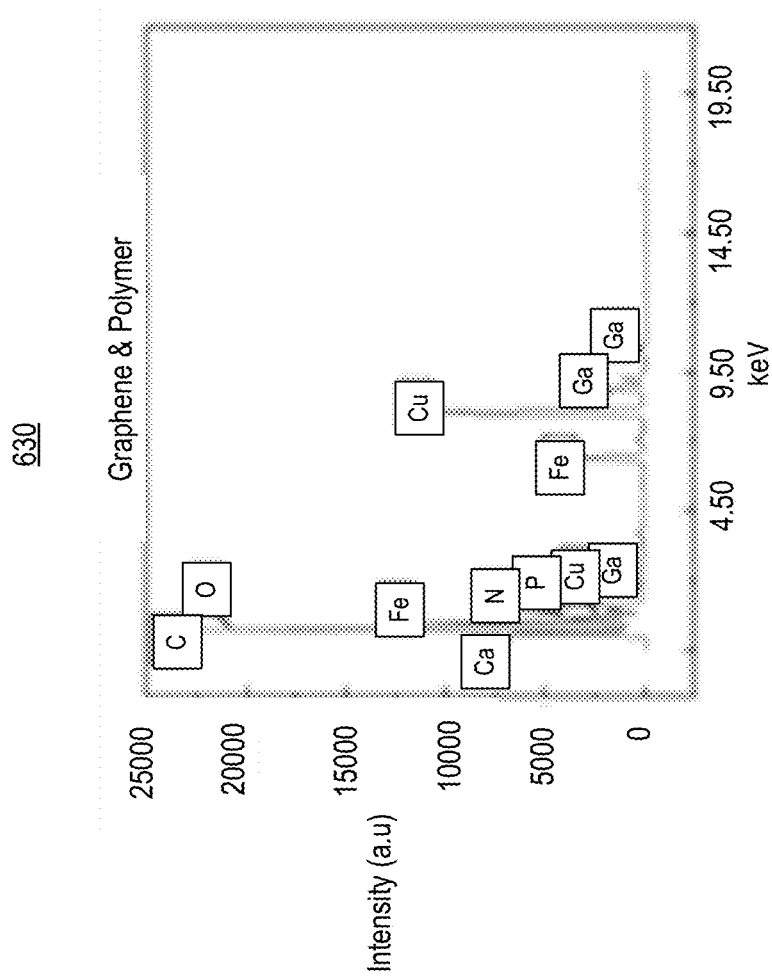
FIG. 6C illustrates a graph of EDS system data of the organic material near galfenol-oxide nanoparticles embedded in laser-induced GO, in accordance with at least one implementation.
Figure 6D:
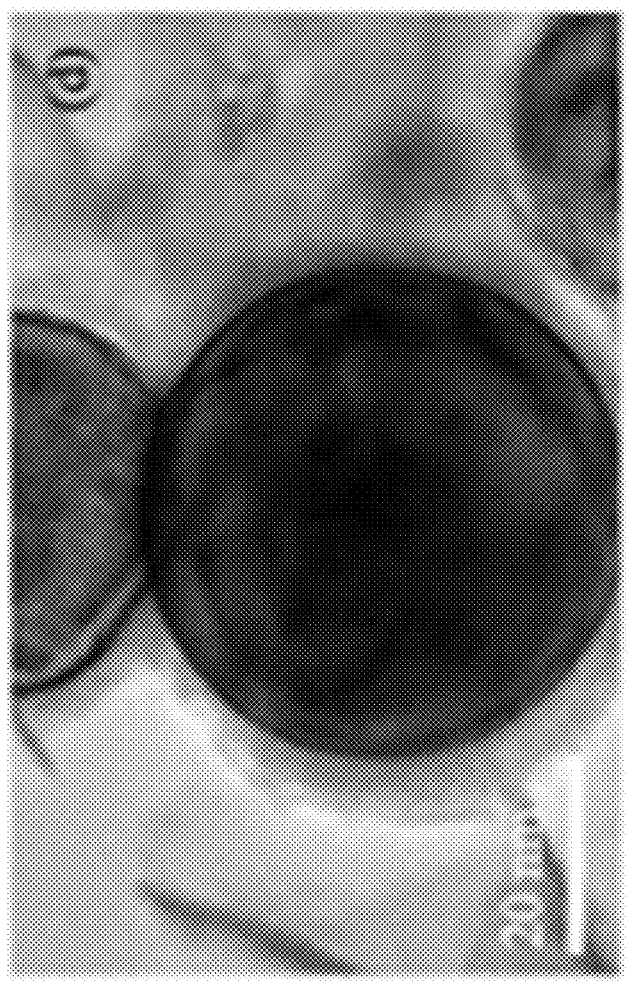
FIG. 6D illustrates a TEM image of galfenol-oxide nanoparticles embedded in the laser-induced GO sheet, in accordance with at least one implementation.
Figure 6E:
FIG. 6E illustrates a TEM image of an oxide ring around galfenol nanoparticles embedded in the laser-induced GO sheet, in accordance with at least one implementation.
Figure 6F:
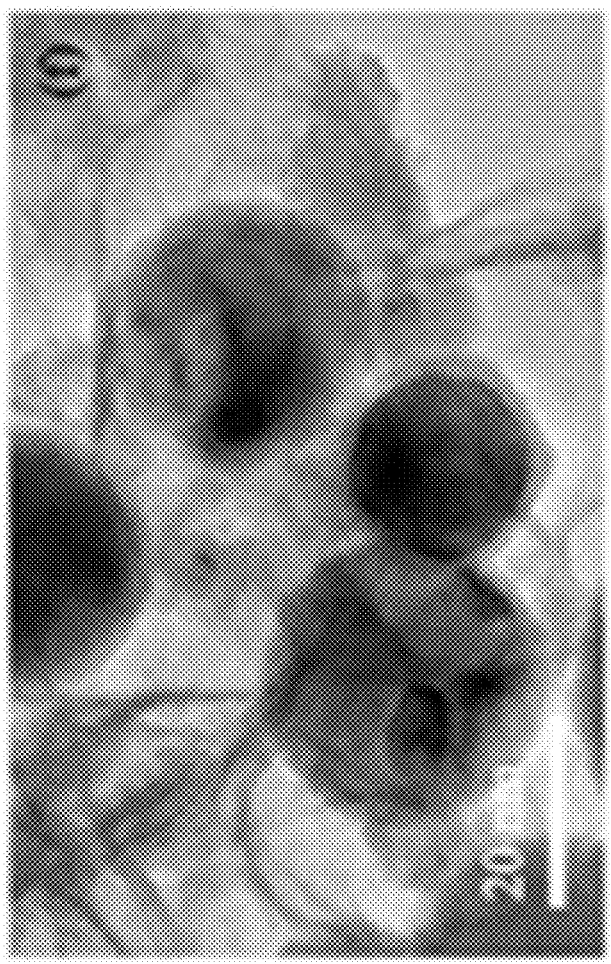
FIG. 6F illustrates a TEM image of a laser-induced GO sheet with embedded galfenol-oxide nanoparticles, in accordance with at least one implementation.

Energy-dispersive x-ray spectroscopy (EDS) data in FIG. 6A, FIG. 6B, and FIG. 6C correspond with the transmission electron microscope (TEM) images in FIG. 6D, FIG. 6E, and FIG. 6F, respectively. A transmission electron microscope (TEM) is utilized to generate high-resolution images of size and presence of galfenol nanoparticles and GO sheets as shown in FIG. 6D, FIG. 6E, and FIG. 6F. An XRD is also used to compare interplanar spacing in few-layer GO with TEM database as shown in Table 1. An energy-dispersive x-ray spectroscopy (EDS) system on TEM is utilized to verify composition of the NPs, the GO sheets, and oxide layer present on many nanoparticles as shown FIG. 6D.

FIG. 6A illustrates graph 600 of EDS system data of center of a GO nanoparticle embedded in laser-induced GO, in accordance with at least one implementation. FIG. 6A shows EDS data from center of particle shown in the particle depicted in FIG. 6D, demonstrating a large quantity of iron (Fe) and gallium (Ga). Large amounts of copper (Cu) and Oxygen (O) are present in sample due to TEM grid being made of copper and oxidation of sample occurring during laser ablation.

FIG. 6B illustrates graph 620 of EDS system data of the shell surrounding a GO nanoparticle embedded in laser-induced GO, in accordance with at least one implementation. The large intensities in FIG. 6B indicate that the oxide layer around the galfenol NPs is rich in iron and oxygen.

FIG. 6C illustrates graph 630 of EDS system data of the organic material near galfenol-oxide nanoparticles embedded in laser-induced GO, in accordance with at least one implementation. Characteristic peaks of carbon (C), followed with the iron (Fe) and galfenol peaks are absorbed. Here, background peak of calcium (Ca), nitrogen (N), and etc. are generated from substrate on which nanoparticles are drop casted.

A TEM can be utilized to generate high-resolution images of the size and presence of galfenol nanoparticles and GO sheets as shown in FIGS. 6D-6F.

FIG. 6D illustrates TEM image 640 of galfenol-oxide nanoparticles embedded in the laser-induced GO sheet, in accordance with at least one implementation. TEM image 640 demonstrates a large quantity of iron (Fe) and gallium (Ga). Large amounts of copper (Cu) and oxygen (O) are present in the sample due to the TEM grid being made of copper and oxidation of the sample occurring during laser ablation.

FIG. 6E illustrates TEM image 650 of an oxide ring around galfenol nanoparticles embedded in the laser-induced GO sheet, in accordance with at least one implementation.

FIG. 6F illustrates TEM image 660 of a laser-induced GO sheet with embedded galfenol-oxide nanoparticles, in accordance with at least one implementation. EDS composition data for the large region in TEM image 650 shows an area including GO and particles proving polymer exists in the solution. PVP polymer contains carbon, nitrogen, and oxide elements confirmed by the EDS peaks. Initial atomic composition of bulk galfenol prior to ablation is $Fe_{81.6}Ga_{18.4}$. Atomic composition of the galfenol-oxide embedded NPs after ablation is $Fe_{83.55}Ga_{16.45}$ through analysis with EDS showing a shift of 1.95% in favor of iron occurred during the laser ablation process.

FIG. 7A is a TEM image 700 of GO folds and galfenol-oxide nanoparticles, in accordance with at least one implementation.

FIG. 7B illustrates a high-resolution TEM image 720 of GO folds, in accordance with at least one implementation. FIG. 7C illustrates TEM image 730 of lattice dimensions of GO folds, in accordance with at least one implementation. FIG. 7B and FIG. 7C refer to layers 3 to 9 of a few-layer GO sheet. A profile measurement is taken using TEM to compute a distance between edges in multilayer GO. Distance between edges in observed GO sheet is approximately 0.63 nm as indicated in FIG. 7C. Measurements are taken for five multilayer GO sheets found in differing locations on TEM grid with an average interlayer spacing of approximately 0.598 nm. This distance may indicate that thinner graphene sheets may be expected to have finer wrinkle-wavelengths or distances from peak to peak of periodical ripples. Distance between layers is much greater than an average lattice spacing for graphite, which may be 0.34 nm. An average interlayer spacing observed indicates few-layer to multilayer graphene-oxide present in produced sample.

FIG. 7D illustrates TEM image 740 of the electron diffraction pattern of a galfenol nanoparticle, in accordance with at least one implementation. An electron diffraction pattern can be seen in TEM image 740 showing diffraction rings exhibited by galfenol-oxide nanoparticles. Here, clear diffraction spots, or bright white spots in TEM image 740, indicate material possesses a crystalline structure characteristic of a gallium-iron alloy. An inverse of radius is proportional to d-spacing, or space between planes of atoms. From the XRD database, bulk graphite has a d-spacing of 2.110 Å in the (100) orientation. The electron diffraction pattern of the synthesized few-layer graphene shown in TEM image 740 results in a d-spacing within 10% error of values for bulk graphite for all orientations observed in XRD image with a corresponding d-spacing of 2.270 Å at an orientation of (100) as shown in Table 1.

Figures 8A, 8B:
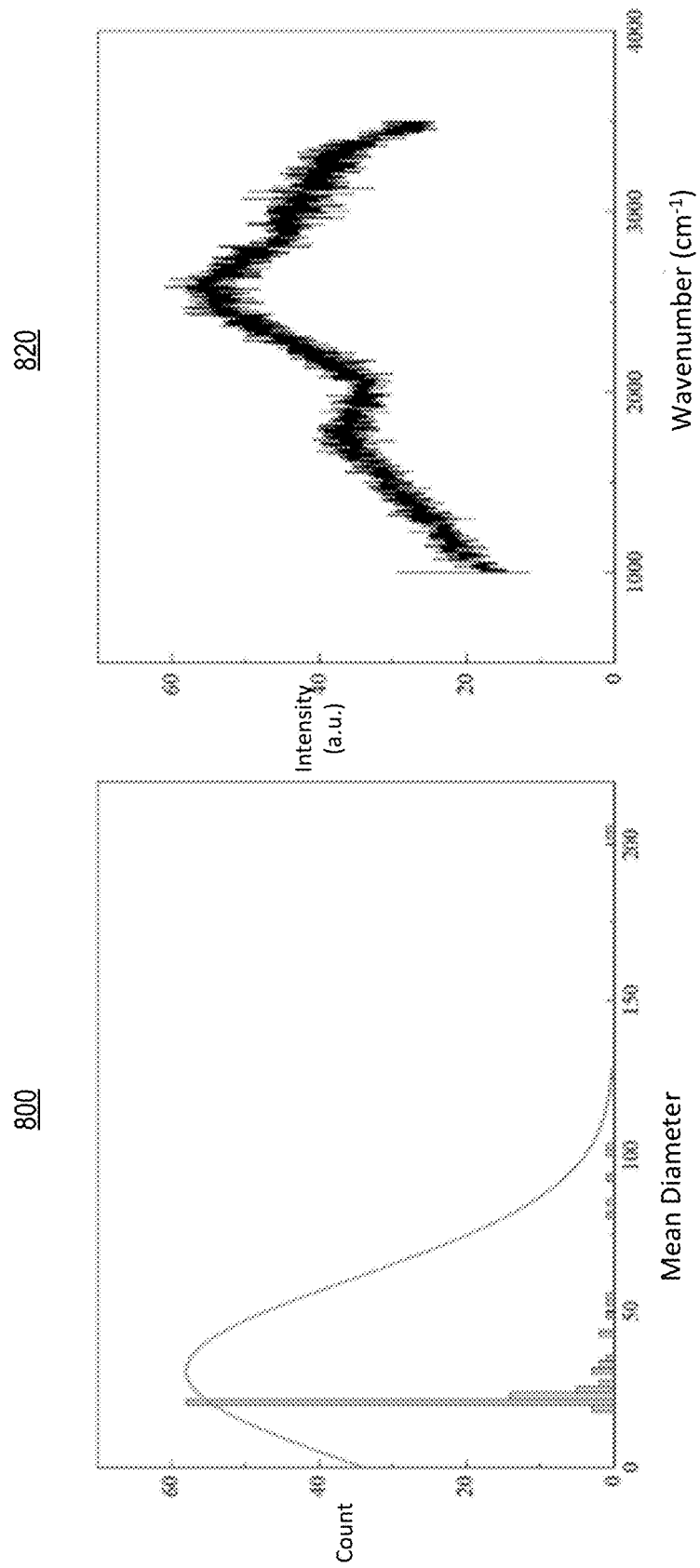
FIG. 8A illustrates a plot showing hydrodynamic diameter distribution among galfenol nanoparticles, in accordance with at least one implementation.
FIG. 8B illustrates a plot showing Raman spectrum for few-layer graphene, in accordance with at least one implementation.

FIG. 8A illustrates plot 800 showing hydrodynamic diameter distribution among galfenol nanoparticles, in accordance with at least one implementation. Distribution shows results for 100 independent trials of material at same laser fluence. Here, average NP sizes are consistent across all 100 samples and result in a mean effective diameter of 30 nm with a variance of 29.90 nm. A majority of galfenol nanoparticles present in the sample are below 50 nm in diameter.

FIG. 8B illustrates plot 820 showing Raman spectrum for few-layer graphene, in accordance with at least one implementation. In at least one implementation, Raman measurements are carried out with a Horiba LabRAM HR Evolution at room temperature at 633 nm. In at least one implementation, a 100× objective is used to locate few-layer graphene sheets, and care is taken to avoid damaging sample during analysis. Three characteristic peaks—G-peak, D-peak, and 2D-peak are observed in Raman spectrum of graphitic materials in plot 820.

Figure 9:
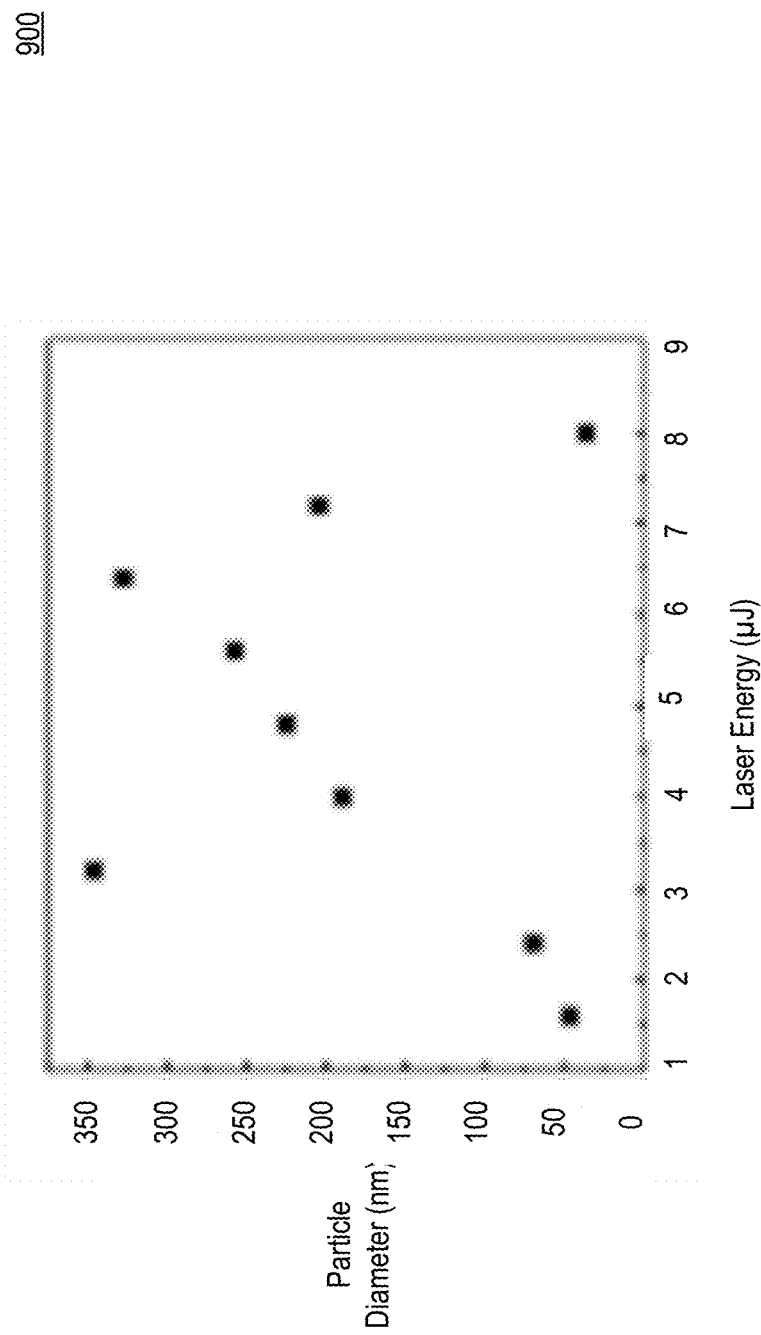
FIG. 9 illustrates plot showing particle size of galfenol in galfenol doped graphene (GDS) as a function of laser energy falling on surface of galfenol bulk material with mixture of graphene and nanoparticles, in accordance with at least one implementation.

FIG. 9 illustrates plot 900 showing particle size of galfenol in galfenol doped graphene (GDS) as a function of laser energy falling on surface of galfenol bulk material with mixture of graphene and nanoparticles, in accordance with at least one implementation. In at least one implementation, galfenol particles in galfenol doped graphene (GDS) can be controlled by incident laser energy.

Figure 10:
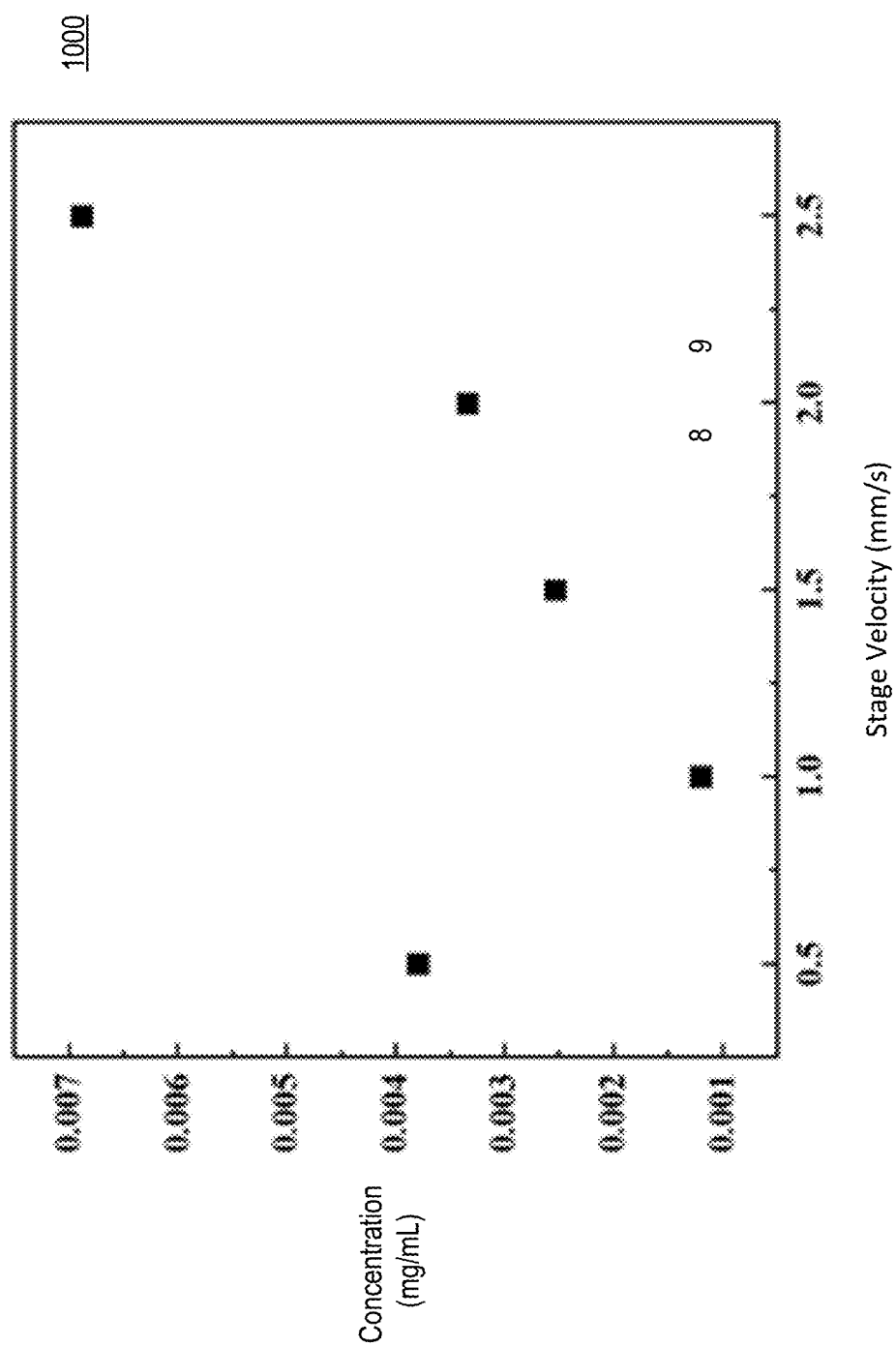
FIG. 10 illustrates a plot showing yield of galfenol doped graphene as a function of stage velocity, in accordance with at least one implementation.

FIG. 10 illustrates plot 1000 showing yield of galfenol doped graphene as a function of stage velocity, in accordance with at least one implementation. In at least one implementation, yield of galfenol nanoparticles embedded in graphene increases linearly with increase in velocity of stage 205.

Figure 11:
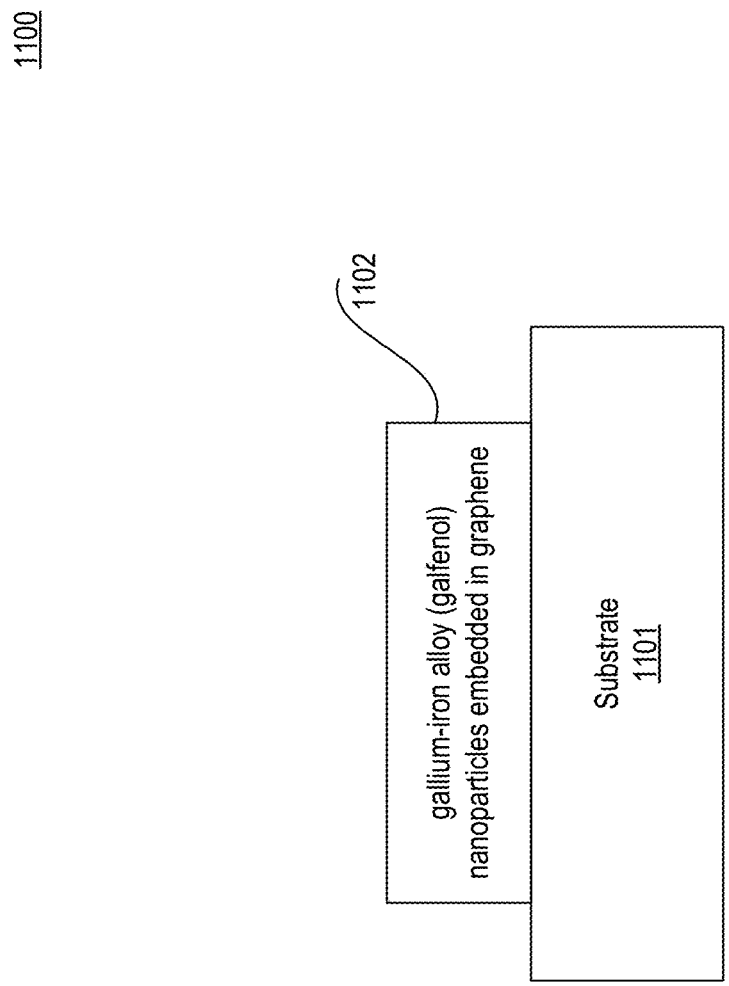
FIG. 11 illustrates a device with Ga—Fe nanoparticle embedded laser-induced graphene on a substrate, in accordance with at least one implementation.

FIG. 11 illustrates device 1100 with Ga—Fe nanoparticle embedded laser-induced graphene on a substrate, in accordance with at least one implementation. In at least one implementation, device 1100 comprises a substrate 1101 and a layer 1102 comprising gallium-iron alloy (galfenol) nanoparticles embedded in graphene. In at least one implementation, galfenol nanoparticles embedded in graphene of layer 1102 are on the substrate. In at least one implementation, galfenol nanoparticles embedded in graphene of layer 1102 have magnetic and conductive properties. In at least one example, galfenol nanoparticles embedded in graphene of layer 1102 is a 2D material. In at least one implementation, galfenol nanoparticles embedded in graphene has a thickness in range of 20 nm to 200 nm. In at least one implementation, substrate 1101 includes one of paper, plastic, cloth, or silicon. In at least one substrate 1101 is one or flexible or inflexible material.

Here, "coupled" and "connected," along with their derivatives, may be used to describe functional or structural relationships between components. These terms are not intended as synonyms for each other. Rather, in particular implementations, "connected" may be used to indicate that two or more elements are in direct physical, optical, or electrical contact with each other. "Coupled" may be used to indicate that two or more elements are in either direct or indirect (with other intervening elements between them) physical, electrical, or magnetic contact with each other, and/or that two or more elements co-operate or interact with each other (e.g., as in a cause-and-effect relationship).

Here, "over," "under," "between," and "on" may generally refer to a relative position of one component or material with respect to other components or materials where such physical relationships are noteworthy. Unless these terms are modified with "direct" or "directly," one or more intervening components or materials may be present. Similar distinctions are to be made in context of component assemblies. As used throughout this description, and in claims, a list of items joined by "at least one of" or "one or more of" can mean any combination of listed terms.

Here, "adjacent" may generally refer to a position of a thing being next to (e.g., immediately next to or close to with one or more things between them) or adjoining another thing (e.g., abutting it).

Here, "signal" may refer to at least one optical signal, current signal, voltage signal, power signal, magnetic signal, or data/clock signal. The meaning of "a," "an," and "the" include plural references. The meaning of "in" includes "in" and "on."

Here, "substantially," "close," "approximately," "near," and "about," generally refer to being within +/−10% of a target value.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

Here, "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

Furthermore, the particular features, structures, functions, or characteristics may be combined in any suitable manner in one or more implementations. For example, a first implementation may be combined with a second implementation anywhere the particular features, structures, functions, or characteristics associated with the two implementations are not mutually exclusive.

While the disclosure has been described in conjunction with specific implementations thereof, many alternatives, modifications and variations of such implementations will be apparent to those of ordinary skill in the art considering the foregoing description. Implementations of disclosure are intended to embrace all such alternatives, modifications, and variations as to fall within the broad scope of the appended claims.

Furthermore, the particular features, structures, functions, or characteristics may be combined in any suitable manner in one or more implementations. For example, a first implementation may be combined with a second implementation anywhere the particular features, structures, functions, or characteristics associated with the two implementations are not mutually exclusive.

Following are examples which illustrate various implementations. The examples can be combined with other examples. As such, various implementations can be combined with other implementations without changing scope of an implementation.

Example 1 is a method for forming graphene-oxide (GO) embedded with gallium-iron alloy (galfenol) nanoparticles, the method comprising: submerging galfenol bulk material in a solution comprising deionized water and polyvinylpyrrolidone; ablating, a first time, the galfenol bulk material submerged in the solution with a laser; removing the galfenol bulk material from the solution after ablating with the laser; drying the galfenol bulk material after removing the galfenol bulk material from the solution; submerging the galfenol bulk material in deionized water after drying the galfenol bulk material; ablating, a second time, the galfenol bulk material submerged in the deionized water; and collecting the GO embedded with galfenol nanoparticles.

Example 2 is a method according to any example herein, particularly example 1, wherein the solution includes substantially 5% per weight of polyvinylpyrrolidone.

Example 3 is a method according to any example herein, particularly example 1, wherein the galfenol bulk material comprises 2 g of the galfenol bulk material and the solution comprises substantially 25 mL of deionized water and substantially 1.25 g of polyvinylpyrrolidone.

Example 4 is a method according to any example herein, particularly example 3, which further includes: positioning galfenol bulk material, which is submerged in the solution, on a stage prior to ablating the galfenol bulk material that is submerged in the solution with the laser; and moving the stage in a back-and-forth motion while ablating the galfenol bulk material that is submerged in the solution with the laser.

Example 5 is a method according to any example herein, particularly example 4, comprising positioning laser to be perpendicular to the stage.

Example 6 is a method according to any example herein, particularly example 4, wherein the stage includes a motorized linear stage and wherein moving the stage in the back-and-forth motion comprises moving the stage at substantially 2.6 mm/second.

Example 7 is a method according to any example herein, particularly example 6, wherein ablating the galfenol bulk material submerged in the solution with the laser comprises ablating the galfenol bulk material for at least 2 minutes.

Example 8 is a method according to any example herein, particularly example 1, wherein laser includes a power of 3 W with a repetition of substantially 1 MHz.

Example 9 is a method according to any example herein, particularly example 1, wherein the laser includes a near-infrared femtosecond laser at substantially 1,040 nm.

Example 10 is a method according to any example herein, particularly example 1, wherein ablating, the second time, the galfenol bulk material submerged in the deionized water comprises ablating the galfenol bulk material for ten minutes.

Example 11 is a method according to any example herein, particularly example 10, wherein submerging galfenol bulk material in deionized water further comprises positioning the galfenol bulk material in a petri dish with about 25 mL of deionized water.

Example 12 is a method according to any example herein, particularly example 1, wherein collecting the GO embedded with galfenol nanoparticles further comprises removing the galfenol bulk material and transferring remaining solution to a sealed vessel.

Example 13 is a device comprising: a substrate; and gallium-iron alloy (galfenol) nanoparticles embedded in graphene, wherein the galfenol nanoparticles embedded in graphene are on the substrate.

Example 14 is a device according to any example herein, particularly example 13, wherein galfenol nanoparticles embedded in graphene have magnetic and conductive properties.

Example 15 is a device according to any example herein, particularly example 13, wherein the galfenol nanoparticles embedded in graphene is a 2D material.

Example 16 is a device according to any example herein, particularly example 13, wherein the galfenol nanoparticles embedded in graphene has a thickness in range of 20 nm to 200 nm.

Example 17 is a device according to any example herein, particularly example 13, wherein the substrate is one of: paper, plastic, cloth, or silicon.

Example 18 is a device according to any example herein, particularly example 13, wherein the substrate is one or flexible or inflexible material.

Example 19 is a system for forming graphene-oxide (GO) embedded with gallium-iron alloy (galfenol) nanoparticles, the system comprising: a laser; a stage, wherein the stage is a linear motion stage; a lens; a laser flow path from the laser, through the lens, and to the stage; a container positioned on the stage, wherein the container contains galfenol bulk material in a first solution that includes deionized water and polyvinylpyrrolidone, wherein the laser is to ablate the galfenol bulk material.

Example 20 is a system according to any example herein, particularly example 19, wherein laser is configured to further ablate the galfenol bulk material, which is ablated in a second solution which includes deionized water, to produce GO embedded with galfenol nanoparticles.

Example 21 is a system according to any example herein, particularly example 19, wherein the stage is configured to move linearly in a back-and-forth motion at substantially 2.6 mm/second.

Example 22 is a system according to any example herein, particularly example 19, wherein the laser includes a near-infrared femtosecond laser at substantially 1,040 nm.

Example 23 is a system according to any example herein, particularly example 19, wherein a focal distance of the lens is substantially 7.5 cm.

Example 24 is a system according to any example herein, particularly example 19, wherein a distance between the lens and the stage is substantially 6.99 cm.

Example 25 is a system according to any example herein, particularly example 19, further including: an optical isolator positioned along the laser flow path, the optical isolator being positioned between the laser and the lens; and a waveplate positioned along the laser flow path, the waveplate being positioned between the optical isolator and the lens.

Example 26 is a system according to any example herein, particularly example 19, wherein the first solution includes approximately 5% per weight of polyvinylpyrrolidone.

Example 27 is a system according to any example herein, particularly example 19, wherein the container further comprises a petri dish containing the galfenol bulk material, which is ablated, and about 25 mL of the deionized water.

Example 28 is an apparatus for forming graphene-oxide (GO) embedded with gallium-iron alloy (galfenol) nanoparticles, the apparatus comprising: one or more components to form GO embedded with galfenol nanoparticles based at least on a direct first ablation of a galfenol bulk material in a first solution including deionized water and polyvinylpyrrolidone, and based on a direct second ablation of the galfenol bulk material after the first ablation.

Besides what is described herein, various modifications may be made to disclosed implementations and implementations thereof without departing from their scope. Therefore, illustrations of at least one implementation herein should be construed as an example, and not restrictive to scope of at least one implementation. Scope of at least one implementation should be measured solely by reference to claims that follow.

What is claimed is:

1. A method for forming graphene-oxide (GO) embedded with gallium-iron alloy (galfenol) nanoparticles, the method comprising:
   submerging galfenol bulk material in a solution comprising deionized water and polyvinylpyrrolidone;
   ablating, a first time, the galfenol bulk material submerged in the solution with a laser;
   removing the galfenol bulk material from the solution after ablating with the laser;
   drying the galfenol bulk material after removing the galfenol bulk material from the solution;
   submerging the galfenol bulk material in deionized water after drying the galfenol bulk material;
   ablating, a second time, the galfenol bulk material submerged in the deionized water; and
   collecting the GO embedded with galfenol nanoparticles.

2. The method of claim 1, wherein the solution includes substantially 5% per weight of polyvinylpyrrolidone.

3. The method of claim 1, wherein the galfenol bulk material comprises 2 g of the galfenol bulk material and the solution comprises substantially 25 mL of deionized water and substantially 1.25 g of polyvinylpyrrolidone.

4. The method of claim 3, further includes:
   positioning galfenol bulk material, which is submerged in the solution, on a stage prior to ablating the galfenol bulk material that is submerged in the solution with the laser; and
   moving the stage in a back-and-forth motion while ablating the galfenol bulk material that is submerged in the solution with the laser.

5. The method of claim 4 comprising positioning laser perpendicular to the stage.

6. The method of claim 4, wherein the stage includes a motorized linear stage and wherein moving the stage in the back-and-forth motion comprises moving the stage at substantially 2.6 mm/second.

7. The method of claim 6, wherein ablating the galfenol bulk material submerged in the solution with the laser comprises ablating the galfenol bulk material for at least 2 minutes.

8. The method of claim 1, wherein laser includes a power of 3 W with a repetition of substantially 1 MHz.

9. The method of claim 1, wherein the laser includes a near-infrared femtosecond laser at substantially 1,040 nm.

10. The method of claim 1, wherein ablating the second time, the galfenol bulk material submerged in the deionized water comprises ablating the galfenol bulk material for ten minutes.

11. The method of claim 10, wherein submerging galfenol bulk material in deionized water further comprises positioning the galfenol bulk material in a petri dish with about 25 mL of deionized water.

12. The method of claim 1, wherein collecting the GO embedded with galfenol nanoparticles further comprises removing the galfenol bulk material and transferring remaining solution to a sealed vessel.

* * * * *